US012319787B2

(12) United States Patent
McLeod et al.

(10) Patent No.: US 12,319,787 B2
(45) Date of Patent: Jun. 3, 2025

(54) METHOD FOR DIRECTLY CREATING A FILM OF 2D POLYMERS FROM MONOMER SOLUTIONS

(71) Applicant: U.S. Army Combat Capabilities Development Command, Army Research Laboratory, Adelphi, MD (US)

(72) Inventors: David C. McLeod, Abingdon, MD (US); Robert H. Lambeth, III, Elkton, MD (US); Kevin R. Waters, Baltimore, MD (US); Emil J. Sandoz-Rosado, Baltimore, MD (US); Eric D. Wetzel, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1071 days.

(21) Appl. No.: 17/195,263

(22) Filed: Mar. 8, 2021

(65) Prior Publication Data

US 2021/0198427 A1 Jul. 1, 2021

Related U.S. Application Data

(60) Continuation-in-part of application No. 16/744,293, filed on Jan. 16, 2020, which is a division of
(Continued)

(51) Int. Cl.
*C08G 73/10* (2006.01)
*C08G 63/00* (2006.01)
(Continued)

(52) U.S. Cl.
CPC ......... *C08G 73/1067* (2013.01); *C08G 63/00* (2013.01); *C08G 63/065* (2013.01);
(Continued)

(58) Field of Classification Search
None
See application file for complete search history.

(56) References Cited

U.S. PATENT DOCUMENTS 7,582,798 B2 9/2009 Yaghi et al.
2009/0299021 A1* 12/2009 Jen .................. C08F 228/06
526/256

(Continued)

OTHER PUBLICATIONS

Patel et al. "Nanoporous Benzoxazole Networks by Silylated Monomers, Their Exceptional Thermal Stability, and Carbon Dioxide Capture Capacity". Chemistry of Materials vol. 26 Issue 23, pp. 6729-6733 (Year: 2014).*

(Continued)

*Primary Examiner* — Megan McCulley
(74) *Attorney, Agent, or Firm* — Eric B. Compton

(57) ABSTRACT

Two-dimensional (2D) polymers and methods for their formation are described herein. To create oriented 2D polymer films, monomers are combined with processing additives within a solvent, creating a solution that can be cast and dried to remove the solvent and form a solid film. The methods can enable transformation of the monomers into oriented films. Film quality can be controlled via multiple processing parameters, including monomer and additive concentrations, shear and elongational flow rates during casting, evaporation rates, and post-process rinsing, buffering, stretching, and thermal treatments. By combining stiff carbon-containing cyclic polymer nodal units with more compliant linear polymer bridge units in an ordered, 2D repeating molecular structure it is possible to tailor the mechanical properties of 2D polymers and their assemblies to provide high stiffness, strength, and toughness. The 2D polymer can also be combined with other 2D materials, linear polymers, or reinforcing materials to create 2D polymer composites.

24 Claims, 11 Drawing Sheets

Related U.S. Application Data application No. 15/434,391, filed on Feb. 16, 2017, now Pat. No. 10,590,241.

(60) Provisional application No. 62/987,190, filed on Mar. 9, 2020, provisional application No. 62/296,892, filed on Feb. 18, 2016.

(51) Int. Cl.

| | |
|---|---|
| *C08G 63/06* | (2006.01) |
| *C08G 63/127* | (2006.01) |
| *C08G 63/133* | (2006.01) |
| *C08G 63/78* | (2006.01) |
| *C08G 69/32* | (2006.01) |
| *C08G 73/02* | (2006.01) |
| *C08G 73/18* | (2006.01) |
| *C08G 73/22* | (2006.01) |
| *C08G 75/32* | (2006.01) |
| *F41H 5/08* | (2006.01) |

(52) U.S. Cl.
CPC ......... *C08G 63/127* (2013.01); *C08G 63/133* (2013.01); *C08G 63/78* (2013.01); *C08G 69/32* (2013.01); *C08G 73/028* (2013.01); *C08G 73/18* (2013.01); *C08G 73/22* (2013.01); *C08G 75/32* (2013.01); *F41H 5/08* (2013.01)

(56) References Cited

U.S. PATENT DOCUMENTS

| | | |
|---|---|---|
| 2010/0143693 A1 | 6/2010 | Yaghi et al. |
| 2014/0031448 A1 | 1/2014 | King |
| 2015/0030864 A1* | 1/2015 | Takeuchi ............ B29C 65/02 428/458 |

OTHER PUBLICATIONS

Dong et al. "Two-dimensional Scaffolds for the Parallel Alignment of Rod-Shaped Conjugated Molecules". J. Org. Chem. vol. 72, Issue 2 pp. 617-625 (Year: 2006).*

Lee et al. "Measurement of the Elastic Properties and Intrinsic Strength of Monolayer Graphene," Science vol. 321, Issue 5887, pp. 385-388, 2008.

Sandoz-Rosado et al., "High strength films from oriented, hydrogen-bonded "graphamid" 2D polymer molecular ensembles," Scientific Reports, vol. 8, Issue 1, pp. 1-11, 2018.

Jiang et al., "High Methane Storage Working Capacity in Metal-Organic Frameworks with Acrylate Links," J. Am. Chem. Soc. 2016, 138, 10244-10251

Cheng and Lee. "Porous Low-Dielectric-Constant Material for Semiconductor Microelectronics." Nanofluid Flow in Porous Media. IntechOpen, 2018.

Bei et al, "Intrinsic low dielectric constant polyimides: relationship between molecular structure and dielectric properties," J Mater Chem C. v. 5, p. 12807, 2017.

Lee et al., "Characterization of oxygen and nitrogen rapid thermal annealing processes for ultra-low-k SiCOH films," J Mater Res. v23 n3 p. 856. 2008.

Lanza and Herrmann, "The Density Dependence of the Dielectric Constant of Polyethylene," J Polym Sci. v28 n118 p. 622. 1958

David W. Burke et al., "Acid Exfoliation of Imine-linked Covalent Organic Frameworks Enables Solution Processing into Crystalline Thin Films," Angew. Chem. Int. Ed. 2020, 59, 2-9 and Supporting Information.

Allen, S. R.; Roche, E. J.; Bennett, B.; Molaison, R., "Tensile deformation and failure of ploy (p-phenylene terephtalamide) fibers," Polymer 1992, 33, (9), 1849-1854.

Lee, C.; Wei, X.; Kysar, J. W.; Hone, J., "Measurement of the Elastic Properties and Intrinsic Strength of Monolayer Graphene," Science 2008, 321, (5887), 385-388.

Pei, Q.; Zhang, Y.; Shenoy, V., "A molecular dynamics study of the mechanical properties of hydrogen functionalized graphene," Carbon 2010, 48, (3), 898-904.

Cranford, S. W.; Buehler, M. J., "Mechanical properties of graphyne," Carbon 2011, 49, (13), 4111-4121.

Enyashin, A. N.; Ivanovskii, A. L., "Graphene allotropes," physica status solidi (b) 2011, 248, (8), 1879-1883.

Lee, J.-H.; Loya, P. E.; Lou, J.; Thomas, E. L., "Dynamic mechanical behavior of multilayer graphene via supersonic projectile penetration," Science 2014, 346, (6213), 1092-1096.

Zhang, P.; Ma, L.; Fan, F.; Zeng, Z.; Peng, C.; Loya, P. E.; Liu, Z.; Gong, Y.; Zhang, J.; Zhang, X., "Fracture toughness of graphene," Nature Communications 2014, 5.

Hwangbo, Y.; Lee, C.-K.; Kim, S.-M.; Kim, J.-H.; Kim, K.-S.; Jang, B.; Lee, H.-J.; Lee, S.-K.; Kim, S.-S.; Ahn, J.-H., "Fracture Characteristics of Monolayer CVD-Graphene," Scientific reports 2014, 4.

Li, Y.; Datta, D.; Li, Z.; Shenoy, V. B., "Mechanical properties of hydrogen functionalized graphene allotropes," Computational Materials Science 2014, 83, 212-216.

Zhang, Z; Wang, X; Lee, J. D., "An atomistic methodology of energy release rate for graphene at nanoscale," Journal of Applied Physics 115, 114314 (2014).

Wetzel, E. D.; Balu, R.; Beaudet, T. D., "A theoretical consideration of the ballistic response of continuous graphene membranes," Journal of the Mechanics and Physics of Solids 2015, 82, (0), 23-31.

Sandoz-Rosado, E.; Beaudet, T. D.; Balu, R.; Wetzel, E. D., "Designing molecular structure to achieve ductile fracture behavior in a stiff and strong 2D polymer 'graphylene,'" Nanoscale, 2016, 8, 10947-10955.

* cited by examiner

METHOD FOR DIRECTLY CREATING A FILM OF 2D POLYMERS FROM MONOMER SOLUTIONS

CROSS REFERENCE TO RELATED APPLICATIONS

This application is a continuation-in-part (CIP) application of U.S. patent application Ser. No. 16/744,293 filed Jan. 16, 2020. That application is a divisional of U.S. patent application Ser. No. 15/434,391 filed Feb. 16, 2017, which issued as U.S. Pat. No. 10,590,241 on Mar. 17, 2020, and which in turn claims the benefit of U.S. Provisional Patent Application No. 62/296,892 filed Feb. 18, 2016. Additionally, this non-provisional application claims the benefit of U.S. Provisional Patent Application No. 62/987,190 filed Mar. 9, 2020. Copies of these patent applications are incorporated by reference in their entities for all purposes.

GOVERNMENTAL INTEREST

The invention described herein may be manufactured, used and licensed by or for the U.S. Government.

Some of the research underlying this invention was supported at least in part under Contract No. W911NF-18-2-0301.

BACKGROUND OF THE INVENTION

Field

The present invention relates generally to polymer compositions, and in particular to those having a two-dimensional (2D) repeating structure and methods for forming the same.

Description of Related Art

Two-dimensional (2D) materials offer unprecedented mechanical properties that can potentially be exploited for structural and barrier applications.

Graphene is one example of a 2D material. It is a fullerene compound consisting of solely bonded carbon atoms. The extraordinary in-plane stiffness and intrinsic strength of graphene in its pristine state have made it a desirable candidate as a structural material.

Graphene has the theoretical potential to enable ballistic barriers that have 10-100× less weight than barriers composed of para-aramid (Kevlar) with the same ballistic limit, and has also demonstrated a specific kinetic energy of penetration an order of magnitude greater than steel and 2-3× greater than Kevlar, as measured by microscale ballistic experiments. However, because graphene is a network of very stiff $sp^2$ double bonds, it is highly resistant to fracture initiation but, once formed, a crack will propagate in a brittle manner. This brittle behavior may limit graphene's potential as a structural engineering material, as local failure due to a flaw or stress concentration is likely to trigger a sudden and catastrophic global failure.

Other 2D polymers have been recently theorized. Graphyne and its related allotropes are composed strictly of extremely stiff carbon-carbon double and triple bonds, likely leading to brittle behavior. Graphane adds single hydrogen bonds to each carbon atom in graphene, resulting in a hexagonal network of $sp^3$ bonds. Studies have also examined carbon allotropes that are randomly hydrogen functionalized. Stiffness and strength in these graphene-like polymers have been incompletely reported, while fracture has not been directly studied in any of these systems.

Compared to linear polymers, such as those used in high performance fibers and textiles such as Nylon (polyamide), Kevlar (para-aramid), and Dyneema (ultrahigh molecular weight polyethylene), 2D polymers provide inherent mechanical advantages. Primarily, fibers composed of linear polymers possess stiffness and strength only along the fiber direction. Combining fibers of multiple orientations can provide effectively isotropic performance, but the effective isotropic stiffness and strength are approximately 50% lower than those of the longitudinal fiber properties.

Improved 2D compounds would be useful.

Additionally, it is desirable to have synthesis methods for the production of 2D polymers and engineering solids (such as particles, films, fibers, coatings) comprising these 2D polymers. Of these form factors, films are the most desirable, as the naturally planar configuration of 2D polymers lends them to the production of high stiffness, high strength films. Ideally, these production processes for 2D polymer films should be low cost; scalable; adaptable to conventional manufacturing processes; amenable to production of freestanding films, film composites, and film coatings onto substrates; and should result in films of high quality, consistency, and functional performance.

SUMMARY OF THE PRESENT INVENTION

Two-dimensional (2D) polymers and expedient methods for their formation from monomer solutions are described herein. To create oriented 2D polymer films, monomers are combined with processing additives within a solvent, creating a solution that can be applied, and removing the solvent and forming a solid film. The methods can enable transformation of the monomers into oriented films. Film quality can be controlled via multiple processing parameters, including monomer and additive concentrations, shear and elongational flow rates during casting, evaporation rates, and post-process rinsing, buffering, stretching, and thermal treatments. By combining stiff carbon-containing cyclic polymer nodal units with more compliant linear polymer bridge units in an ordered, 2D repeating molecular structure it is possible to tailor the mechanical properties of 2D polymers and their assemblies to provide high stiffness, strength, and toughness (i.e., mechanical superiority). The 2D polymer can also be combined with other 2D materials, linear polymers, or reinforcing materials to create 2D polymer composites. The inherent dimensionality of 2D polymers and their ability to be stacked into ordered and chemically interactive ensembles gives them inherent benefits in a variety of barrier and structural applications over current stiff and strong linear polymer technologies.

According to embodiments, a method of producing a two-dimensional (2D) polymer film comprises (a) providing one or more first monomers comprising three or more functional groups per molecule; (b) providing one or more second monomers comprising two or more reactive groups per molecule; (c) dissolving or dispersing the first and second monomers in a solvent; (d) reacting the first and second monomers to form 2D bond network; and (e) removing the solvent. The first and second monomers are judiciously selected so as to form 2D polymer comprising a regular, repeating, 2D bond network of (i) a plurality of nodes comprised one or more carbon-containing cyclic nodal units which are joined by (ii) one or more linear polymer bridge units, wherein (iii) the bridge units are between 0.1-100 nm long; (iv) each node is bonded to 3 or more bridge units; (v) the bridge units maintain the overall planarity of the 2D polymer, wherein the majority of bonds of the bridge units and their adjacent nodal units are located within a limiting distance measured perpendicularly from a single plane upon which the molecule substantially lies corresponding to three times the length of a carbon-carbon single bond; and (vi) the polymer comprises a single molecule having a length greater than 50 nm in both lateral in-plane dimensions.

The bridge units of the 2D polymer may comprise, wholly or in part, a ladder polymer. In other cases, the nodal unit may be selected from cyclic or acyclic non-carbon-containing groups, such as triphenyl phospine, triphenyl amine, triphenyl borane, triphenyl silane, borozene, or silicene. In other cases, the nodal unit may be formed of non-cyclic carbon containing units, such as double-bonded or triple bonded carbon.

The method may further comprise adding one or more processing additives to the dissolved/dispersed solvent/monomer mixture. Exemplary processing additives comprise one 2D polymer or 2D oligomer. They can comprise a linear, branched, star, comb, and/or hyper-branched polymer. Other processing additives may include catalyst, reaction modulators, surfactants, and/or dispersants. The processing additive might also comprise a cross-linkable polymer. Various other processing additives might also comprise nanoparticles, nano-platelets, and/or nanofibers. The method can further include confining the dissolved/dispersed solvent/monomer mixture in a gap between two surfaces during and/or after polymerization. In some implementations/embodiments, the dissolved/dispersed solvent/monomer mixture undergoes flow before, during, or after polymerization.

In some embodiments, the method may further comprise subjecting the resulting 2D polymer film to one or more of the post-treatments such as rinsing, neutralizing, thermal annealing, solvent annealing, UV exposure, radiation exposure, e-beam exposure, uniaxial stretching, biaxial stretching, and through-thickness compression.

For the solutions, the one or more solvents be include water, trifluoroacetic acid, sulfuric acid, anhydrous sulfuric acid, nitric acid, phosphoric acid, dimethylformamide, dimethylacetamide, n-methyl-2-pyrrolidone, 1,3-dimethyl-2-imidazolidinone, dimethylpropyleneurea, hexamethylphosphoramide, hexafluoro-2-propanol, trifluoroethanol, nitromethane, and/or dimethyl sulfoxide.

In further embodiments, the method may further comprise chemically treating the resulting 2D polymer film to chemically convert the first bond chemistry into a second bond chemistry. For instance, the chemical conversion of a first bond chemistry and to a second bond chemistry can comprise oxidation of imines to amides; reduction of imines to amines; cyclization of an imine to a thiazole, oxazole, quinolone, pyridine, carbamate or thiocarbamate; linker exchange with an orthohydroxy aldehyde to form a keto-enamine; linker exchange of an imine with hydrazide to form an acyl hydrazone; exchange with hydrazine hydrate to form an azine; and/or exchange with phenyl hydrazine to form a phenylhydrazone.

The method may further include casting the 2D polymer film in the presence of fibers, yarns, textiles, fabric, knits, braids, and/or felts to form a fiber-reinforced composite.

The first and/or second monomers may be selected from the group consisting of:

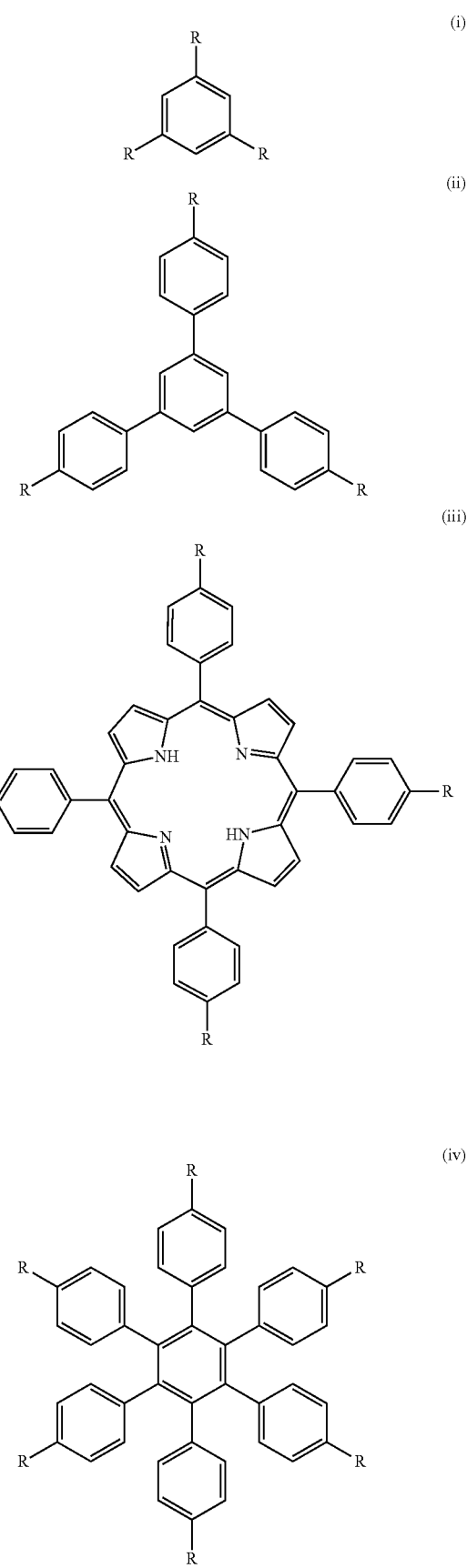

-continued

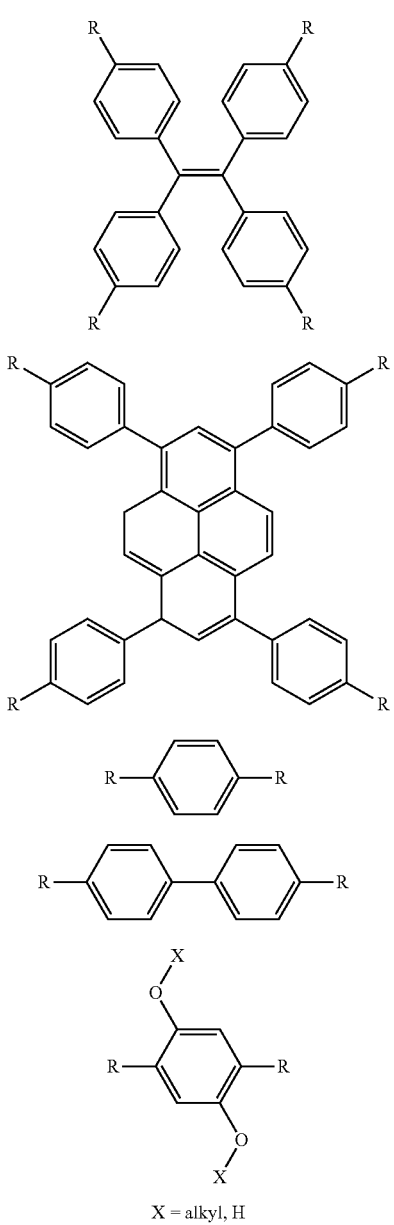

X = alkyl, H where R comprises one or more chemical functional species capable of reacting to form one or more bonds as part of a chemical linkage.

The resulting chemical linkage may be an imine, phenazine, imide, azine, cyanovinylene, boronic ester, hydrazone, ester, benzoxazole, polyhydroquinone-diimidazopyridine, and/or β-ketoenamine, as examples.

In various implementations/embodiments, the first monomer comprises a first R and the second monomer comprises a second R which are selected so as to react to form a chemical linkage B. For instance, the first R, second R, and chemical linkage B may be selected from the group consisting of: an aldehyde and an amine to form an imine; 1,2 diamine and tetraone to form a phenazine; amine and cyclic anhydride to form an imide; aldehyde and hydrazine to form an azine; aldehyde and phenylacetonitrile to form a cyanovinylene; phenolic and carboxylic acid or ester to form a ester; boronic acid and catechol to form a boronic ester; aldehyde and hydrazide to form a hydrazone; aldehyde and 2-aminophenol to form a benzoxazole; a tetraaminopyridine and dihydroxyterephthalic acid to form a polyhydroquinone-diimidazopyridine and/or diamine and phloroglucinol to form a b-ketoenamine.

According to embodiments, a two-dimensional (2D) polymer film is provided or otherwise formed by the aforementioned methods. It may have one or more of the following properties: (a) a modulus of at least 10 GPa and a strength of at least 1 GPa; (b) a dielectric constant less than 2.5 or, more preferably, less than 2; (c) a glass transition temperature of at least 300° C.; (d) a mass density less than 1 g/cc or, more preferably, less than 0.7 g/cc; (e) a density-normalized modulus of at least 10 GPa/(g/cc) or, more preferably, at least 50 GPa/(g/cc); and/or (f) a density-normalized strength of at least 2 GPa/(g/cc) or, more preferably, at least 5 GPa/(g/cc).

These and other embodiments of the invention are described in more detail, below.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1A shows two different tri-active monomers in solution forming a 2D polymer network, FIG. 1B shows two different monomers in solution, one tri-active, one bi-active forming a 2D polymer network, FIG. 1C shows monomers with oligomers (gray) in solution forming a 2D polymer network, and FIG. 1D shows monomer/solvent mixtures with surfactants and growth modulators included.

FIG. 2A shows slot die coating, FIG. 2B shows doctor blading, FIG. 2C shows spin coating, FIG. 2D shows dip coating, FIG. 2E show growth on a liquid surface and FIG. 2F shows interfacial polymerization.

FIG. 3A shows continuous processing including heating, drying, UV irradiation, washing, and buffering and FIG. 3B shows continuous drawing/stretching processing under heated conditions.

FIG. 4A shows fiber-reinforced composite with a 2D polymer matrix, FIG. 4B shows laminated heterostructure with 2D polymer layers interspersed with layers that could include other 2D polymers, other 2D inorganic materials, ceramics, metals, linear polymers, or cross-linked polymers, FIG. 4C shows linear polymer penetrating through the pores of a 2D polymer molecule reinforcement, FIG. 4D shows a side view of linear polymer penetrating through a 2D polymer molecule, and FIG. 4E shows a side view of a cross-linked polymer penetrating through a 2D polymer molecule.

FIG. 5A shows an oriented, amorphous ensemble, FIG. 5B shows an oriented, semi-crystalline ensemble, FIG. 5C shows a mis-oriented ensemble, and FIG. 5D shows a partially cross-linked ensemble.

FIG. 6A shows regular crystalline stacking, FIG. 6B shows crystalline stacking with rotationally-aligned layers, and offset translational registry, and FIG. 6C shows turbostratic stacking with no regular translational or rotational registry.

FIG. 7A shows an embedded flaw domain, and FIG. 7B shows a grain boundary.

FIG. 8A is a generic chemical depiction showing a reversible imine linker reaction with solvent/water/etc (TFA/water and/or $H_2SO_4$/water), and FIG. 8B shows a TAPB-PDA reaction and resulting 2D polymer.

Figure 1A:
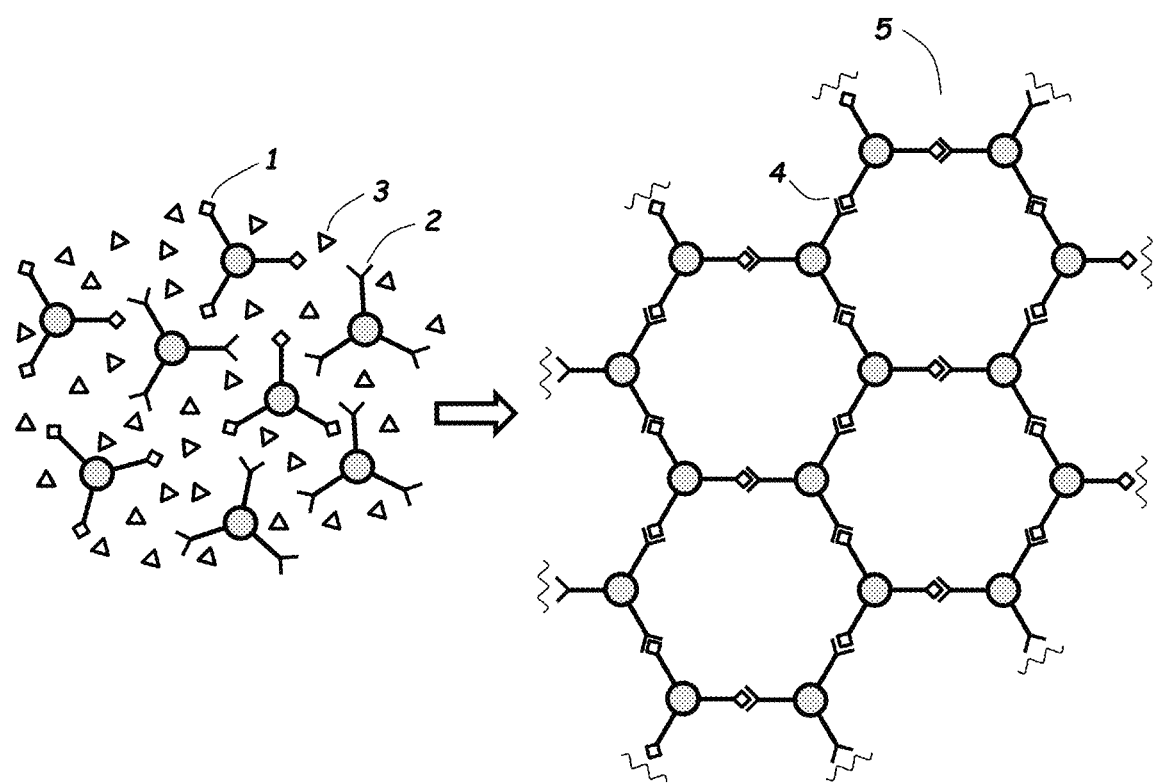
FIGS. 1A-1D depict monomers in solution forming a 2D polymer network where

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention expanded and build upon the polymer compositions having a two-dimensional (2D) repeating structure, and methods for forming the same that were disclosed in the aforementioned patent application. Various high performance 2D polymer films and methods for production of such films from monomer solutions are described herein.

As used herein, "2D polymer" (2DP) refers to a highly regular, periodic, covalent bond network of atoms that are configured in a substantially planar arrangement. Novel embodiments of these were first introduced in the aforementioned '391 parent patent application. Additional 2DP embodiments described herein may include single molecules, mono-layer sheets of molecules, stacks of molecules, and three-dimensional solid bodies composed of thousands or millions of molecules arranged into a cooperative material ensemble. Embodiments of the present invention herein further provide cooperative material ensembles in the form of oriented film and methods to produce such films from monomer solutions.

According to embodiments, a method of producing a two-dimensional (2D) polymer film may include: (a) providing one or more first monomers comprising three or more functional groups per molecule; (b) providing one or more second monomers comprising two or more reactive groups per molecule; (c) dissolving or dispersing the first and second monomers in a solvent; (d) reacting the first and second monomers to form 2D bond network; and (e) removing the solvent.

The first and second monomers may be judiciously selected so as to form 2D polymer. Generally, the 2D polymer embodiments form a regular, repeating, two-dimensional 2D bond network of (i) a plurality of nodes comprised of one or more carbon-containing cyclic nodal units which are joined by (ii) one or more linear polymer bridge units that may be generally characterized by four key parameters. First, (a) the bridge units are between 0.1-100 nm long. Second, (b) each node is bonded to 3 or more bridge units. Third, (c) the bridge units maintain the overall planarity of the 2D polymer, wherein the majority of bonds of the bridge units and their adjacent nodal units are located within a limiting distance measured perpendicularly from a single plane upon which the molecule substantially lies corresponding to three times the length of a carbon-carbon single bond. Fourth, (d) the 2D polymer comprises a single molecule having a length greater than 50 nm in both lateral in-plane dimensions.

The linear bridge units may include, but are not necessarily limited to: (a) polyethylene; (b) polyamide; (c) polyoxazole, polythiazole, or polyimidazole; (d) polyhydroquinone-diimidazopyridine; (e) a copolymer of 4-hydroxybenzoic acid and 6-hydroxy-2-naphthoic acid; (f) polyester; (g) polyacetylene; (h) polyamic acid; or (i) polyimide.

For instance, the nodal units may include, but are not necessity limited to, one of more: benzene, triarylbenzene, hexaphenylbenzene, borozene, silicene, oxazole, thiazole, pyrene, triazine, triarylamine, triarylphosphine, triarylborane, phthalocyanine, hexaazatriphenylene, hexa-peri-benzocoronene, tetrathiafulvalene triazatruxene, 9,9'-bicarbazole or imidazole rings. The bridge units may include, but are not necessarily limited to: amide, benzoxazole, benzothiazole, benzimidazole or polyhydroquinone-diimidazopyridine molecular units. More particularly, the bridge unit may include one or more polymer, co-polymer, or sub-unit of: polyethylene, p-phenylene terephthalamides, poly-metaphenylene isophthalamides, polyamidobenzimidazole, polybenzoxazole, polybenzothiazole, polybenzimidazole, polyhydroquinone-diimidazopyridine, benzene, pyrene, cellulose, polyamide, polyester, polyimide, polyethylene terephthalate, polyethylene naphthalate, 4-hydroxybenzoic acid, 6-hydroxy-2-naphthoic acid, polyacetylene, polyacrylonitrile, and/or poly(l-lactid-co-caprolactone). In addition, the bridge units may be capable of hydrogen bonding with similar 2D polymer molecules. This provides practical advantages with respect to processing, synthesis, and mechanical performance.

Considering a cooperative material ensemble containing thousands or millions of molecules in the form of an oriented film, a wide range of film thicknesses could be produced. Optimal film thickness is determined by the specific end use. Generally, film thicknesses between 10 nm-1 mm are most practical. Below 10 nm thickness, the molecular thickness is approached and unusual physical effects can be observed. While these unusual effects can be of practical utility, and we do not exclude these very thin films and their unique properties from the scope of the present invention, the primary embodiments of the present invention are directed towards films of 10 nm thickness and greater. Films above 1 mm thick are unlikely to be flexible, and would more likely behave like rigid plates. While such materials are also considered within the scope of the present invention, the primary embodiments of the present invention seek to create thin, flexible, and conformal films.

More preferably, film thicknesses would be between 50 nm and 500 µm. Films above 50 nm in thickness can easily be seen visually and handled mechanically, so they become practical to manufacture, transfer, and test. Films below 500 µm become particularly flexible and conformal; for example, it would be expected that long lengths of such films could be rolled onto a cylindrical tube for collection, storage, and transport, similar to other high performance polymer films and webbing.

Mechanical robustness is also critically important for practical handling of films, and relevance to engineering applications such as structures and barriers. Therefore, it is desired that the films have a modulus of at least 10 GPa, and a strength of at least 1 GPa.

Although planar, 2D molecules are primarily described herein, embodiments of the present methods may also find applicability to the formation of three dimensional covalent organic frameworks (3D-COFs). A 3D-COF is a regular, repeating, three-dimensional network of (i) a plurality of nodes joined by (ii) one or more linear polymer bridge units that may be generally characterized by four key parameters. First, (a) the bridge units are between 0.1-100 nm long. Second, (b) each node is bonded to 3 or more bridge units. Third, (c) the bridge units extend in multiple directions in three dimensional space. Fourth, (d) the 3D-COF comprises a single molecule having a length greater than 50 nm in at least one dimension. Whereas a 2D polymer comprises a planar molecular with high regularity, the 3D-COF is a three-dimensional polymer with high regularity. The synthesis and processing methods described for the 2D polymer embodiments can also be used in the production of 3D-COFs of high quality. Specifically, a 3D-COF can be produced by reacting one or more monomers selected so as to form a 3D-COF, where one or more first monomers comprise three or more functional groups per molecules; where one or more second monomers comprise two or more reactive groups per molecules; dissolving the first and second monomers in a solvent; reacting the first and second monomers to form a 3D bond network; and removing the solvent.

General Method for Synthesis of 2D Polymer Films from Monomer Solutions

Some 2D compounds, such as graphene, can be synthesized via chemical vapor deposition onto a catalytic substrate. This process requires very high temperatures (~1000° C.), process times of 10 s of minutes, and results in films only a few atomic layers thick. In contrast, conventional linear polymers are synthesized by batch reaction of monomers in a large reaction vessel, typically in the presence of solvent that is later removed. This chemical production route is highly scalable, producing large volumes of material at low cost, and high quality, sufficient for commercialization. Most industrial polymers are produced in this manner. Therefore, it is desirable to produce 2D polymers using chemical synthesis. A chemical synthesis route would be expected to result in high quality, low cost material; and would be expected to be easily adaptable to existing manufacturing infrastructure, reducing the barriers to industrialization.

A general method for synthesis of 2D polymers is described herein. The method comprises (a) providing a first monomer comprising three or more functional groups per molecule to function as the nodal units; (b) providing one or more additional monomers comprising two or more reactive groups per molecule to function as the bridge units; (c) providing processing additives to enhance quality or speed of polymerization; (d) dissolving or dispersing the first monomer, second monomer, and processing additives in one or more solvents; (d) reacting the first monomer with the additional monomer or monomers to form a 2D bond network; and (f) removing the solvent. This reaction mixture, comprising monomers, solvent, and process additives, will be referred to as the "film dope," although this solution could be used to form non-film solids such as fibers and plates.

A wide variety of monomer pairings is envisioned. Monomers containing amines and aldehydes result in the formation of imine-bonded 2D polymer bridge units. Because these imine bonds are reversible, the 2D bond network can undergo continuous "error correction," which as used herein means forming and breaking bonds to allow the network to gradually approach the ideal configuration of a perfectly periodic, symmetric arrangement of nodes and bridge units. Herein, a "reversible" bond as used herein as a chemical bond in which the free energy difference separating the non-covalently-bonded reactants from bonded product is near equilibrium, and the activation barrier is relatively low, such that the reverse reaction which cleaves the chemical bond easily occurs. In contrast, an "irreversible" bond as used herein is one that, once formed, is not expected to cleave under expected process conditions. A "chemical linkage" as used herein refers to a molecular sub-group that contains one or more bonds that are formed during the polymerization process, or during post-treatments, and form part of the 2D polymer bond network. In some instances, the "chemical linkages" may include a "linker," "bridge unit," "bond", and/or "functional group" as described in any of the aforementioned parent patent application(s) and/or which may also be used in the art.

Other types of reversible bonds capable of undergoing continuous error correction include but are not limited to the following chemical structures: imine (i), phenazine (ii), imide (iii), azine (iv), cyanovinylene (v), boronic ester (vi), hydrazone (vii), benzoxazole (viii), and β-ketoenamine (ix):

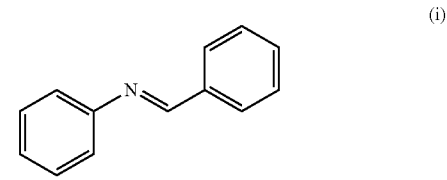

(i)

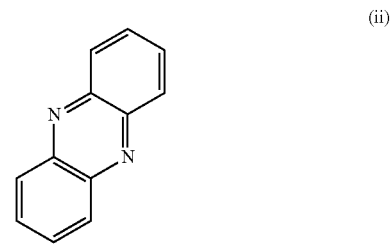

(ii)

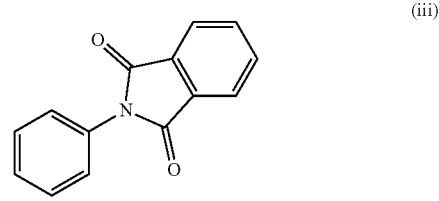

(iii)

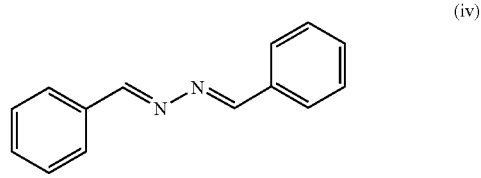

(iv)

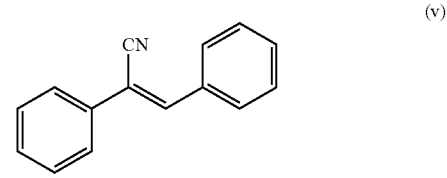

(v)

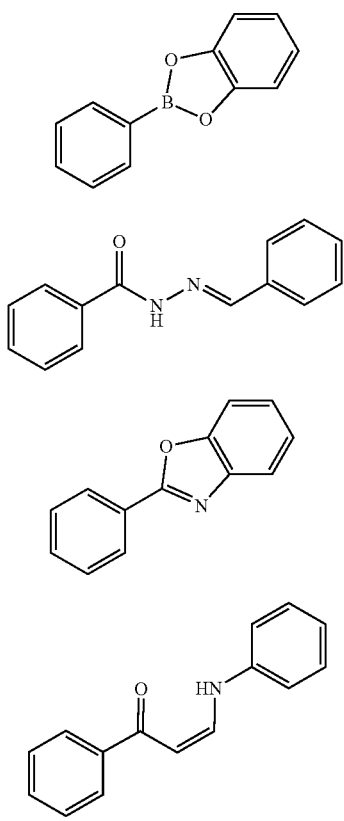

Reversible Diels-Alder chemistries could also be applied to 2D polymer synthesis. This family of reversible bonds typically requires elevated temperature to achieve a reversible state. Therefore, it is conceivable that 2D polymer film could be produced by mixing Diels-Alder functional monomers in solvent, heating that solution to achieve a state of reversibility, removing solvent to drive polymerization, and then cooling to room temperature to stabilize the 2D polymer bond network. Furthermore, the cooled solid could be reheated to again achieve a state of reversibility to further facilitate the error correction process and increase crystallinity. Examples of reversible Diels-Alder chemistries include but are not limited to reactions between conjugated dienes such as furan, anthracene, and cyclopentadiene with substituted alkenes such as maleimide, acrylates, methacrylates, or dicyclopentadiene.

The solvent or solvent mixture used to host the monomer plays an important role in synthesis. The monomers should readily dissolve or suspend in the solvent, with high mobility so that they can mix and react with complementary monomer. The solvent should be removable in a controlled manner, leading to deliberately increasing monomer concentration. This increase in monomer concentration leads to an increasing likelihood of polymerization; as more solvent is removed, monomer and polymer mobility begins to decrease, causing polymerization to slow and eventually resulting in stable solid product. The solvent should also provide appropriate interactions with reaction products, for example solubilizing water products from condensation polymerizations. The choice of solvents, the initial concentration of monomer, the proportion of monomer relative to ideal stoichiometry, and the rate of solvent removal, are all important process variables that can be designed to result in a 2D polymer film of desirable characteristics. The solvent should also, ideally, be of reasonable cost and with manageable health and environmental impact, to make the process practical to commercialize.

A large number of solvents are known to be applicable to chemical processing and polymerization, and these solvents would be expected to be relevant to synthesis of 2D polymer films. Some examples of liquids that can serve as solvents include organic solvents, organic acids, mineral acids, water, and ionic liquids. These solvents may include, but are not necessarily limited to: water, trifluoroacetic acid, sulfuric acid, anhydrous sulfuric acid, nitric acid, phosphoric acid, dimethylformamide, dimethylacetamide, n-methyl-2-pyrrolidone, 1,3-dimethyl-2-imidazolidinone, dimethylpropyleneurea, hexamethylphosphoramide, hexafluoro-2-propanol, trifluoroethanol, nitromethane, or dimethyl sulfoxide. Organic acids and mineral acids in their liquid state are particularly attractive as solvents since they can act as both solvents and catalyst.

Solvent blends with mixed vapor points can be useful for staged, multi-step synthesis. In this scenario, the monomer/solvent mixture can be subject to a first processing stage to remove the first solvent, creating a partially solvated material that can be for example stored, drawn, irradiated, or stacked as an intermediary step. This material can then be subjected to a subsequent processing operation to remove the second solvent and produce a solid film.

For the case of monomers with reactive amines and aldehydes, a solvent mixture of water and trifluoroacetic acid is particularly effective. While a wide range of mixture ratios are possible, exemplary mixtures with 1-5% water content are desirable and may be used. Mixtures of sulfuric acid and water have also been found to be effective. An advantage of sulfuric acid is that it is a common, low cost solvent used in many industrial processes. Therefore, processes based on sulfuric acid are likely to be readily scaled into an industrial setting.

Processing Films, and Inducing States of Crystallinity and Orientation

To create films, it is desirable for polymerization to take place in a manner that confines the polymerization process within a narrow gap. For example, a thin liquid film of the film dope can be cast onto a flat substrate, so that the polymerization takes place in the narrow gap between the solid substrate and the free surface of the liquid film. The distance between a solid substrate and the free surface of the film dope will be referred to as the "wet film thickness." Alternatively, the film dope could be confined between two solid surfaces, such as in a narrow matched-tool film mold. Or, the film dope could be cast between layers of immiscible fluid, so that polymerization takes place at a fluid-fluid interface. The gap height can be tailored to control the wet film thickness. For example, gap heights between 10 nm and 1000 µm or, more preferably, between 50 nm and 50 µm would result in wet film thicknesses that are less than the gap height, due to volume loss as solvent is removed from the mixture.

For extremely small wet film thicknesses, such as 200 nm or less in height, it would be expected that confinement effects could encourage polymerization and molecular orientation. That is, the film dope thickness can become so thin that the monomer, partially-reacted oligomer, or extending 2D polymer molecules, which are generally planar molecules, would tend to align within the film plane. This alignment would encourage polymerization into a large, flat 2D bond networks, and would also encourage the resulting 2D polymer molecules to remain parallel to the bounding film surfaces. If confinement effects are desirable, thicker films could be produced progressively by sequentially casting very thin, confined 2D polymer films to build up thickness.

Molecular orientation is generally desirable for high performance polymers, as it allows for maximizing cooperative material properties. For many applications of 2D polymer films it will be desirable for the planar covalent bond networks to be arranged parallel to the free surfaces of the film. This configuration orients the covalent molecular bonds in the plane of the film, so that the in-plane mechanical stiffness and strength of the film are maximized. Other relevant material properties, such as toughness, dielectric constant, dielectric strength, wear resistance, lubricity, chemical diffusion rate, filtration selectivity, thermal tolerance, and chemical resistance are also likely influenced by molecular orientation.

Molecular orientation can also be achieved by interfacial polymerization, wherein polymerization occurs at the interface between two immiscible fluids, each fluid containing one or more of the following: dissolved or suspended monomer or monomers, catalysts, surfactants and processing additives. Interfacial polymerization can occur at a flat quiescent boundary between two liquids, or it can occur on the interface of colloidal mixtures of liquids, or it can occur at the interface of flowing liquids.

It is common to characterize linear polymer ensembles in terms of an orientation parameter, which summarizes the average orientation of molecules relative to a material plane. The orientation parameter can be based on weight-averaged or number-averaged molecular statistics. Similar orientation parameters can be envisioned for 2D polymer films, capturing the relative orientation of the molecular planes relative to the film surface. Lower orientation angles suggest molecular orientation more parallel to the film surface. Films with average orientation values of 20° or lower would be likely to possess orientation-enhanced properties; orientation values of 5° or lower would be likely to lead to highly enhanced film properties.

Additionally, it is known that linear polymer ensembles achieve their higher mechanical properties when the polymeric molecules are "chain extended;" that is, the molecules are stretched into a substantially straight configuration, minimizing bends, kinks, and loops. This extended conformation provides optimal translation of macroscopic loads to the individual covalent bonds. Similarly, it is desirable for the 2D polymer molecules to be very flat, minimizing wrinkles, folds, and bends; a term for this configuration could be "plane extended."

Molecular orientation and plane extended conformations in 2D polymer films are expected to be encouraged by shearing action, both during polymerization, and during solvent removal. Therefore, processing methods that form a film in the presence of shearing action are advantageous. Examples of such processes include spin coating, drawing a flat, controlled edge over a flat surface, referred to as a "doctor blade," slot die casting, die extrusion, drop casting, curtain casting, electrodeposition, casting on a moving web, casting on a rotating drum, or casting on a spinning wheel. Fortunately, all of these processes have been industrialized, and are scalable. Therefore, it would be expected that such shear-inducing processes that convert film dope into oriented film would be adaptable to commercialization of high quality, high performance 2D polymer films.

Extensional and elongational flows, such as through an expansion die, via pultrusion, or via tensioned extrusion, are also be expected to enhance molecular orientation.

Additional plane extension and orientation enhancement could be induced via post-process treatments, such as thermal annealing, solvent annealing, UV exposure, radiation exposure, e-beam exposure, uniaxial stretching, biaxial stretching, and through-thickness compression. These processes could be undertaken individually or simultaneously. For example, uniaxial or biaxial tensile stretching at elevated temperature would be expected to lead to improved orientation.

Controlling the crystalline nature of the 2D polymer film is also important. Herein, crystallinity is meant to capture a wide range of features relative to molecular order. Intermolecular stacking, for example, could be random with respect to rotation angle and translational registry, resulting in for example a "turbostratic" amorphous state. Alternatively or additionally, the molecules could exhibit a consistent intermolecular registry, such as A-B-A or A-B-C stacking arrangement. Within the plane of a single molecule, that molecule could be perfectly periodic and defect free, which could be considered a perfectly crystalline molecule; or, the molecule could be formed of flaw-free regions joined by defect-rich grain boundaries. Considering all these possible configuration, a 2D polymer film could possess an amorphous character, crystalline character, or semi-crystalline character.

Although it may be difficult to generalize material properties based on crystalline state, one could hypothesize that amorphous films would be transparent or translucent, with lower stiffness, strength, and chemical resistance, but high toughness; perfectly crystalline films may also be transparent or translucent, with high stiffness and strength, high chemical resistance, and low toughness, and semi-crystalline films would be opaque, with intermediate levels of stiffness, strength, toughness, and chemical resistance. These hypotheses regarding the effect of crystallinity of 2D polymer film properties are not meant to be restrictive or predictive; rather, they are meant to exemplify why film crystallinity is relevant to material properties, and important to control during processing.

One method for controlling crystallinity is to control the rate of polymerization. Faster polymerization generally leads to lower crystallinity, because there is less time for the molecules to arrange into well-ordered crystalline domains. Therefore, rapid solvent removal, high monomer concentrations, and polymerization catalysts/accelerants are likely to lead to a reduced state of crystallinity. In contrast, gradual solvent removal, lower monomer concentrations, and polymerization inhibitors are likely to lead to an increased state of crystallinity. The addition of crystal seed particles, such as nanoparticles or nano-platelets of 2D polymer or other 2D compounds such as graphene or hexagonal boron nitride, can also trigger crystal growth; the number of seed particles added can be used to induce a small number of large crystals, or a large number of small crystals. Surface topography, roughness, or chemical templating can also be used to induce crystallization. Post-processing can also be used to manage crystallinity. Tensile loading at elevated temperatures is used to induce crystallinity in high performance linear polymer fibers, therefore, similar methods would be expected to apply to 2D polymer films. Heating films above their glass transition temperature or melt temperature, followed by rapid quenching, would be expected to drive films towards an amorphous state. Each of these synthesis and post-processing techniques can be applied and tailored to control the state of crystallinity in 2D polymer films.

It may also be desirable to wash and buffer the film after synthesis, so as to create a solvent-free, catalyst-free, and neutral pH for simplified handling and environmental longevity. General removal of contaminants, byproducts, and unreacted monomer is also beneficial.

The reversibility of the polymerization reactions that can be used to form 2D polymers make these materials particularly suitable for annealing post-treatments. For example, immersing the 2D polymer into a solvent mixture, or exposing it to a solvent vapor environment, can induce shuffling of the reversible bonds. The rate of shuffling, or exchange, can be controlled via factors including solvent type, concentration, catalyst type and temperature. Selecting these factors appropriately can allow a 2D polymer film to gradually transform into a state of improved molecular perfection, molecular size, and crystallinity. Application of tension, shear, or through-thickness compression simultaneously with solvent and/or thermal exposure would also be likely to induce further improvements in molecular structure, size, crystallinity, and orientation. This annealing process is fundamentally different from solvent or thermal annealing of a conventional polymer with irreversible bonds. For an irreversibly-bonded polymer, annealing takes place via dissolution or mobility enhancement of the polymer, but without the process of the reversible exchange of bonds. Therefore, the rate of annealing and resulting enhancement in molecular perfection for a conventional polymer will generally be less dramatic than those observed for a reversibly bonded 2D polymer.

A wide range of processing additives could be included in the film dope. Catalyst could be included to accelerate or encourage polymerization; some organic and mineral acids can simultaneously serve both solvation and catalytic functions during polymerization. Reaction modulators that contain only a single functional group that can participate in the polymerization, such as aniline or benzaldehyde, rather than two or more of the same participating groups, such as the monomers, can reversibly react with a complimentary functionalities of growing 2DPs without forming a new node or bridging group. Modulators can be included if the desire is to control the rate of polymerization or precipitation by reversibly capping the growing polymer, and could be varied to complement the polymerizable functional groups present on the monomers and the relative reactivities of those groups. Other modulators may include: 4-(dimethylamino) aniline, 4-hydroxyaniline, 4-methoxyaniline, 4-methylaniline, 4-phenylaniline, 4-fluoroaniline, 4-acetylaniline, 4-(trifluoromethyl) aniline, 4-cyanoaniline, 4-nitroaniline, 4-(dimethylamino)benzaldehyde, 4-hydroxybenzaldehyde, 4-methoxybenzaldehyde, 4-methylbenzaldehyde, 4-phenylbenzaldehyde, 4-fluorobenzaldehyde, 4-acetylbenzaldehyde, 4-(trifluoromethyl)benzaldehyde, 4-cyanobenzaldehyde, 4-nitrobenzaldehyde. Dispersants and surfactants may be necessary to control the mixing and suspension of monomer, oligomer, polymer, and other additives. Oils, plasticizers, extenders, gelling agents, thickeners, thixotropes, and rheological modifiers can also be used to control processing states and final material properties.

2D Polymer as an Additive

An alternative approach for creating 2D polymer films would be to synthesize 2D polymer powder, dissolve the powder in solvent to create film dope, cast the film dope, and then remove the solvent to create 2D polymer film. While effective, this approach has some potential disadvantages. Synthesizing 2D polymer powder is a multi-step process, can require a unique combination of solvents, catalysts, inhibitors, and other additives, and will typically require washing, buffering, and directed solvent extraction. The synthesized 2D polymer powder then needs to be re-dissolved in an appropriate solvent mixture, with appropriate additives, to process into films. This approach requires more steps, materials, and complexity compared to producing 2D polymer films directly via monomer dissolution to create film dope.

Pre-polymerized 2D polymer could be used as a processing additive to a monomer-containing film dope. This 2D polymer could act as a seeding particle to encourage polymerization and crystallization. Similarly, partially reacted oligomers could be included as a processing additive to encourage polymerization and crystallization.

2D Polymer Composites

Another class of processing additive is mechanical reinforcement. Nanoparticles, nano-platelets, or nanofibers could also be added to the film dope, which would result in a reinforced film. Specific nano-reinforcement of interest includes, but is not limited to, silica, precipitated calcium carbonate, buckyballs, carbon nanotubes, talc, clays, whiskers, and graphene flakes. In some cases, the surfaces of these particles can be chemically or physically modified to enhance adhesion of the reinforcement to the 2D polymer. Shearing or extensional action can also be induced to enhance mixing and orientation of the reinforcement.

Other processing additives could include linear polymer or cross-linkable, thermosetting polymer. In this scenario, a non-limiting embodiment would be considering individual molecules or domains of 2D polymer acting as high stiffness and strength reinforcement within a matrix of linear or thermosetting polymer.

Of particular interest is the engineering of composite systems in which the linear polymer or cross-linkable polymer penetrates through the pores of the reinforcing 2D polymer. A common challenge in composite materials, and nanocomposites in particular, is mechanical inefficiency due to the "shear lag" effect. Shear lag refers to the fact that the ends of a reinforcement tend to be poorly loaded by the host matrix, so loading between matrix and reinforcement occurs via shear traction loads at the interface between matrix and reinforcement. The longitudinal load within the reinforcement therefore builds gradually from the end of the reinforcement. If the reinforcement is very short, the reinforcement strains never match the local strains in the matrix. If the reinforcement is sufficient long, the longitudinal loads in the reinforcement build sufficiently so that, at a certain distance from the end of the reinforcement, the reinforcement develops strains that are closely matched to the local matrix strains. Therefore, it is common for composites with finite length reinforcement to exhibit mechanical properties that are significantly lower than composites with very long reinforcement, even at comparable volume fraction of reinforcement.

A closely related problem is poor bonding between the matrix and reinforcement. When a composite is loaded, failure often initiates at the interface between matrix and reinforcement, due to poor bonding and stress concentrations from the jump in stiffness across the matrix-reinforcement interface. This poor bonding can lead to composite failure under conditions where the reinforcement has not yet reached its full load-carrying ability. This challenge has been observed repeatedly in studies where, for example, graphene-loaded polymer composites do not exhibit nearly as much stiffness and strength as would be expected from conventional rule-of-mixture arguments.

Conceptually, these problems can be eliminated with a composite reinforced by 2D polymer. In this scenario, the polymer matrix penetrates through the pores in the 2D polymer bond network. Any loading in the bulk polymer matrix is therefore transferred through the reinforcement, and the reinforcement at all times will be in a state of equal strain with the matrix. This construction would lead to negligible shear lag effect, and nearly perfect bonding between matrix and reinforcement. The resulting composite would obey rule-of-mixture arguments, even if the 2D polymer molecules are relatively short, resulting in extremely high stiffness and strength. Because of the short length of the molecules, however, the composite could be injection molded or cast into complex shapes, processes that are not possible with conventional long-fiber composites.

Polymers that can penetrate into the pores of the 2D polymer include linear, branched, star, comb, hyper-branched, cyclic, polycyclic, dendritic, and cross-linked polymers. Mechanically-interlocked polymers such as polyrotaxanes, or thermally reversible polymers such as vitrimers could also be used. These polymers can be melt infused, cross-linked in the presence of the 2D polymer, or polymerized in the presence of the 2D polymer. The 2D polymer may be formed prior to introduction of the penetrating polymer, or may form simultaneously during the penetration process. This inter-penetrating molecules could also be referred to as "2D polymer molecular composites."

For composites reinforced by 2D polymer, bridge units that fully or partially comprise ladder polymers are particularly attractive. Ladder polymers are polymer chains that contain one or more fused ring structures, resulting in parallel covalent bond paths. Ladder polymers are generally known to exhibit unusually high stiffness, strength, and stability compared to more conventional linear polymers. For composites reinforced by 2D polymer, matrix loads are transferred into the 2D polymer via mechanical interference and intermolecular bonding in the pores of the 2D polymer reinforcement. This loading will result in in-plane bending of the bridge units. Ladder polymers, with their parallel courses of covalent bonds, will be exceptionally resistant to in-plane bending. Therefore, a 2D polymer based on ladder polymers will be exceptionally well-suited as composite reinforcement.

Linear polymers that would be particularly attractive for creating 2D polymer composites could include polyamides, polyimides, polyesters, polyethelyene, polycarbonate, acrylics, polystyrene, polypropylene, polylactide, thermoplastic elasomers, thermoplastic urethanes, polyureas, fluoropolymers. Biopolymers such as cellulose, lignin, collagen, chitosan and silk could also be combined with 2D polymers. Crosslinkable polymers that would be particularly attractive for creating 2D polymer composites could include epoxies, phenolics, urethanes, silicones, polydicyclopentadiene, polyesters, vinyl esters, melamine, nitrocellulose, and cyanate esters. These crosslinks could be formed in a number of ways, including exposure to elevated temperature, radiation, electron-beam, or ultraviolet radiation Another composite could be created by combining 2D polymer with micro-scale reinforcement, such as conventional fibers, yarns, textiles, fabrics, knits, braids, of felts. These reinforcements are typically composed of fibers with diameters between 1-100 µm; example fiber materials may include glass, graphite, carbon, boron, basalt and aramid. Natural fibers such as silk, flax, cotton, hemp, and linen could also be used. To create a composite, one could drop cast 2D polymer film dope into the reinforcement, wetting the reinforcement and penetrating between fibers to form a matrix that mechanically couples the reinforcement. Alternatively, 2D polymer film dope could be injected into a mold containing reinforcement, or vacuum infiltrated into layers of reinforcement inside a vacuum bag. Reinforcement could also be dipped into a bath of 2D polymer and then heated to remove solvent; this process could be integrated into a roll-to-roll process to continuously produce reinforced 2D polymer. These composites could be particularly useful as tough, high temperature composites for engine components, hypersonic vehicles, re-entry vehicles, or printed circuit boards.

Another composite could be created by layering 2D polymer films with other films and foils such as linear polymer film, a metallized layer, ceramic film, graphene film, graphite film, and/or another 2D polymer film. The films could be fully dense, or contain engineering porosity. The films could be chemically bonded, adhesively bonded, mechanically interlocked, or held together with weaker bonds such as electrostatic or van der Waals interactions. The films could instead be designed to have poor bonding to encourage interlayer slip. The films could be mechanically stacked, combined in a continuous roll-to-roll process, or formed in-situ via coating, sputtering, evaporation, or CVD processes. The relative thicknesses of the layers, material selections, and gradients in thickness and composition could be chosen to achieve specific functional performance. For example, a layered film could be designed for resistance to mechanical fracture, to create optical filtering effects, or to achieve a tuned rate of selective permeability.

Intermolecular Interactions, Including of Hydrogen Bonding of 2D Polymers 2D polymers of infinite size would be preferred for many applications, as this would enable materials with macroscale properties closely matched to ideal, molecular scale properties. However, polymer synthesis routes that are rapid and cost-effective are preferred for practical polymer manufacturing, and these synthesis routes typically result in the production of many thousands and millions of finite-sized molecules. These finite-sized molecules are then combined into a cooperative, oriented material ensemble, to produce a solid body for practical application.

Intermolecular attractions, such as hydrogen bonding, electrostatic interactions, pi-pi stacking and van der Waals interactions, are important intermolecular mechanisms for achieving mechanical integrity, chemical resistance, and thermal resistance in molecular ensembles. Weaker attraction forces like van der Waals forces can improve ensemble properties. However, stronger intermolecular forces such as from hydrogen bonding are likely to lead to significant enhancements in ensemble properties. Other intermolecular attractions, such as pi-pi stacking interactions, and electrostatic interactions may assist in the ensemble of interactions between molecular layers. For example pi-pi interactions can be mediated through aromatic molecules. Electrostatic interactions can be encouraged by including highly electropositive atoms such as hydrogen, lithium, sodium, potassium, magnesium, calcium, boron, silicon, and phosphorous, along with highly electronegative atoms such as oxygen, fluorine, chlorine, nitrogen, bromine, sulphur or carbon. The specific pairings of boron and nitrogen, oxygen and hydrogen, and hydrogen and fluorine are known to be particularly effective for forming electrostatic interactions between polymers.

For a given 2D polymer structure, the overall intermolecular cohesion will be dependent on the density, quality and strength of the individual intermolecular attractions. For example, a highly dense network of strong intermolecular hydrogen bonds would be expected to produce a film with very high levels of mechanical stiffness and strength, as well as thermal and chemical resistance. A sparse network of weak hydrogen bonds would result in a less cohesive ensemble. A highly dense network of pi-pi interactions may result in a more cohesive molecular ensemble compared to a sparse network of hydrogen bonds, even if the individual hydrogen bonds are individually very strong.

While achieving a strong level of overall intermolecular attraction is often desirable, in some cases it may be desirable to tailor the intermolecular attraction differently depending on the application. For example, a high performance solid lubricant would need to be engineered with low intermolecular shear strength, to enable sliding between molecules. In another example, a dense hydrogen bonded network may result in a film with a thermal softening point that is higher than its thermal degradation temperature, presenting challenges for film processing and post-processing. In contrast, an intermediate level of intermolecular hydrogen bonding could allow for high mechanical integrity under engineering operating conditions, but would allow the material to be softened at elevated temperatures to enable post-process thermal drawing that enhances polymer orientation and crystallinity.

To enhance ensemble cohesion via hydrogen bonding, polymer units that can form intermolecular hydrogen bonds must be included in the 2D polymer network. Example polymer units include amide, urea, urethane, amine, carboxylic acid, esters, ethers, imide, imidazole, alcohols, carbonyls, hydrazones, benzoxazole, benzothiazole, benzimidazole or polyhydroquinone-diimidazopyridine molecular units. The orientation of these functional groups within the 2D polymer can determine the strength of the intermolecular bonds, as hydrogen bonds are highly directional. For example, some functional group pairings may prefer to form intramolecular bonds, which is generally less preferable to forming intermolecular bonds that enhance film cohesion. Intercalated small molecules such as water can also act to form hydrogen bond bridges between appropriate functional groups.

The hydrogen bonding groups may be formed via direct synthesis from monomer, for example an aldehyde group can react with a hydrazide group to form a hydrazone or an amine can react with a carboxylic acid to form an amide. Alternatively, an initial structure may be formed that is amenable to synthesis, but does not generate intermolecular bonds; this 2D polymer may then be subject to a post-synthesis chemical, mechanical and/or thermal conversion to create chemical groups that are amenable to intermolecular hydrogen bonding. For example, an aldehyde is reacted with an amine to form an imine bond. The imine bond is subsequently oxidized to form an amide bond.

Pi-pi interactions can promote film cohesion, if they exist with sufficient quality and population. A highly aromatic 2D polymer structure in which the aromatic groups are oriented such that molecular stacking favors close proximity of those aromatic groups will be favorable for pi-pi interactions. In many cases, molecules that are substantially flat, with aromatic groups lying substantially parallel to the molecular plane, are likely to generate substantial intermolecular pi-pi interactions.

An initial 2D polymer structure may be formed that is amenable to synthesis, but may then be subject to a post-synthesis chemical, mechanical and/or thermal conversion to create chemical groups that result in enhanced physical properties or functionalities. In particular, reversible chemistries are attractive for synthesizing high quality 2D polymer molecules, but the reversible bonds may have limited chemical and thermal stability, or may not have sufficient mechanical stiffness and strength. Therefore, post-synthesis treatments to convert bond chemistries can be an effective strategy for enhancing the performance of a 2D polymer. Examples of post-process chemical conversions include oxidation of imines to amides, reduction of imines to amines, cyclization of an imine to a thiazole, oxazole, quinolone, pyridine, carbamate or thiocarbamate, linker exchange with an orthohydroxy aldehyde to form a keto-enamine. It may also be beneficial to convert from one reversible chemistry to another. Examples include linker exchange of an imine with hydrazide to form an acyl hydrazone, exchange with hydrazine hydrate to form an azine and or exchange with phenyl hydrazine to form a phenylhydrazone. Some non-limiting examples of non-reversible bond chemistry includes an amide, amine, imide, benzoxazole, benzimidazole, benzthiazole, carbamide, thiocarbamide, quinolone, and/or polyhydroquinone-diimidazopyridine molecular units.

Applications of 2D Polymers

The 2D polymer films described herein have a wide range of practical applications.

Their high stiffness and strength, along with low density, can be used to create structures that are stiff, strong, and lightweight. Vehicles such as fixed wing and rotary wing aircraft, automobiles, bikes, unmanned aerial vehicles, unmanned ground vehicles, boats, submarines, and robotic platforms could all benefit from advanced lightweight structures. Ballistic barriers, such as for turbine blade confinement layers or protective body armor could also benefit from these properties.

The potential for materials with high temperature resistance is attractive for a range of applications, including heat exchangers, supports for electronics, and composites for high speed vehicles and re-entry vehicles. A 2D polymer reinforced by glass fabric, for example, could serve as a substrate for a printed circuit board. 2D polymers that readily pyrolize into a highly graphitic solid, for example containing polyacrylonitrile, pitch, or highly aromatic nodes and linkers, could be useful pre-polymers for carbon-carbon composites.

2D polymers could be applied as coatings onto substrates. These coatings could provide enhanced function or protection, for example providing a dielectric barrier; a corrosion barrier; a thermal barrier; and electronic barrier; an electromagnetic absorber; a wear resistant coating; a scratch-resistant coating; a low friction coating; or an anti-bacterial, anti-fungal, or anti-fouling surface. 2D polymers can also serve as a host for functional agents such as catalyst or other reactive additives.

2D polymers could be used as a selective membrane for chemical separation processes, reverse osmosis filter, water purification, water desalination, as a separator in a hydrogen fuel cell, as a separator in a battery or other electrochemical device, or as a biological filter.

2D polymers could be included in medical devices, to provide mechanically robust, chemically resistant, and biologically compatible surfaces. For biomechanical wear surfaces, such as in artificial joint replacements, a 2D polymer saturated with a lubricating fluid could provide a particularly robust, self-lubricating, and biologically analogous material to cartilage.

2D polymers could be used to construct mechanical resonators, for high speed electronics, switches, acoustic sensors, filters, transducers, stacked crystal filters, RF receivers, and RF transmitters. The exceptionally high stiffness and low density of 2D polymers may allow them to reach very high frequencies more easily than existing thin film materials.

Integrated circuits require a thin, low dielectric constant base layer to enable close spacing of high-speed nm-scale device elements. Because of the very low mass density of 2D polymers (for example, 0.5 g/cc), they will be expected to also exhibit a very low dielectric constant (for example, 1.1-2.0) due to the corresponding low population of dipoles within the material. Specific bond types and functional groups could also be incorporated into the 2D polymer to minimize polarizability. For example, sigma bonds would be preferred over pi bonds; saturated hydrocarbon 2D polymers may be preferred; and, considering single bonds, C—C and C—F bonds may be preferred over C—O and C—H bonds. Furthermore, the mechanical, thermal, and chemical resiliency of 2D polymers would make them likely to survive integrated circuit processing steps including chemical mechanical polishing. These factors, combined with their propensity to naturally form atomically flat films and amenability to spin coating, could make 2D polymers ideally suited for integrated circuit substrates.

The low dielectric constant of 2D polymers also suggests that they will have a very low optical index of refraction. For example, a 2D polymer with a dielectric constant of 1.5 would be expected to have an index of refraction of 1.22. Controlling the crystallinity of a 2D polymer solid should also allow transparent bodies to be made. These combined properties suggest that 2D polymers could be used for novel optical devices, including waveguides, lenses, lasers, diffraction gratings, and optical coatings.

For these and other applications, 2D polymers could be used in the form of a monolithic film; stacked heterogeneous film; nano-particle, nano-platelet, or nano-fiber reinforced film; a fiber or fabric-reinforced composite; or a coating on a thicker substrate, or between thicker materials.

2D polymers may also find utility as additives for propellants and energetics.

Figure 1B:
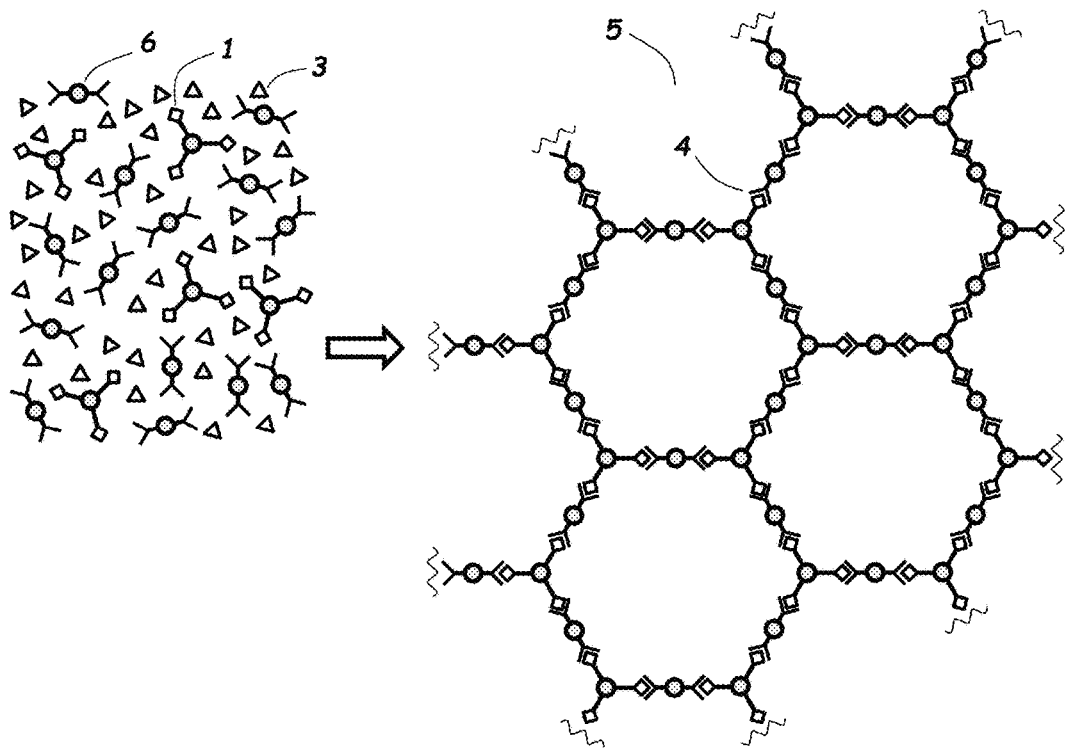
Figure 1C:
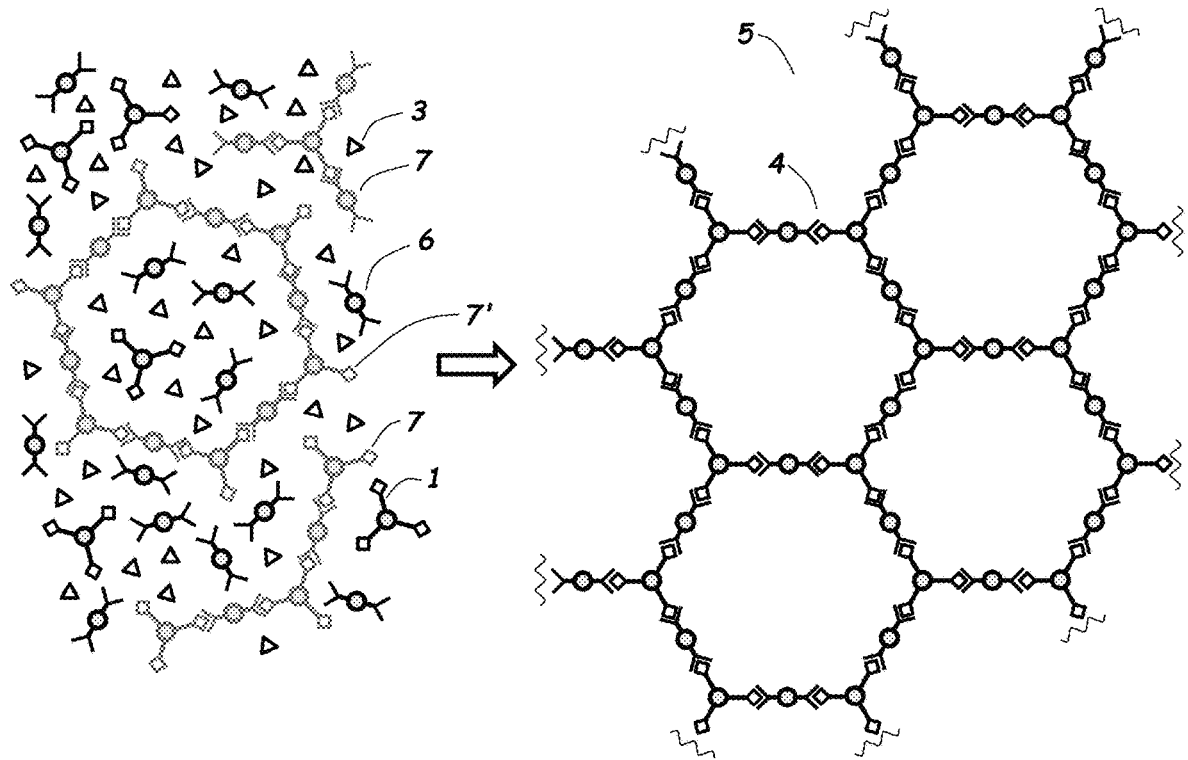
Figure 1D:
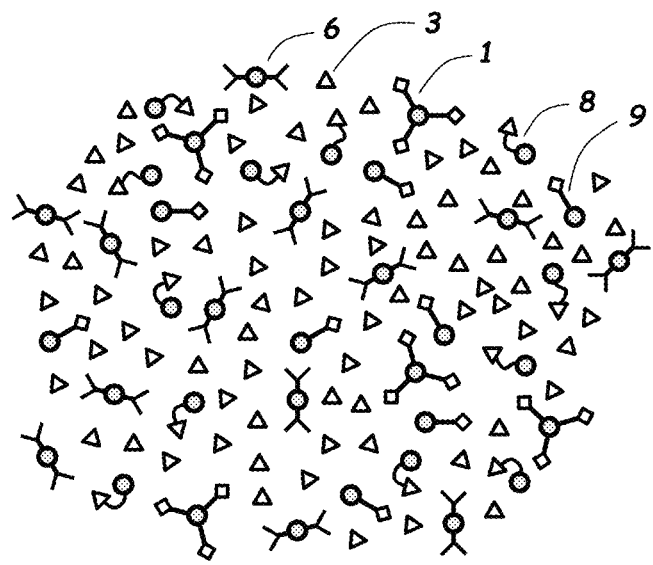

FIGS. 1A-1D depict a schematic of an example synthesis concepts. In FIG. 1A, a first tri-functional monomer 1 and second tri-functional monomer 2 are combined in solvent 3 to create a 2D polymer 5 with three linkers per node with new covalent bonds 4. In FIG. 1B, a tri-functional monomer 1 is reacted with a bi-functional monomer 6 in solvent 3 to form a 2D polymer 5. In FIG. 1C, monomers 1 and 6 are mixed with pre-reacted oligomers 7 and 2D polymer 7' in the presence of solvent 3, leading to a final 2D polymer 5. The presence of the pre-reacted oligomer and 2D polymer may enhance the speed or quality of the resulting 2D polymer synthesis. FIG. 1D shows a starting reaction solution, in which monomers 1 and 6, surfactant 8, and reaction modulators 9 are all present in the host solvent 3.

Figure 2A:
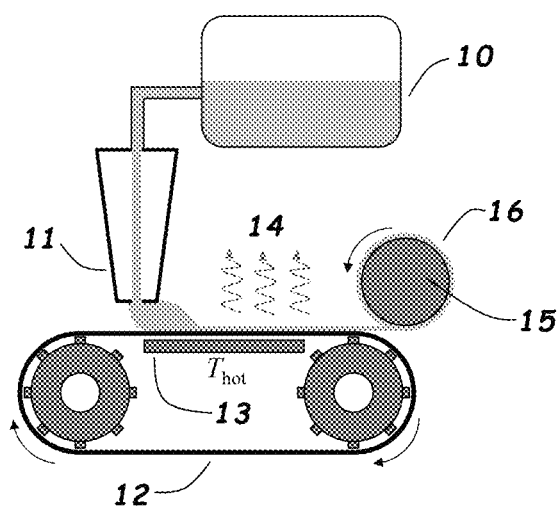
FIGS. 2A-2F illustrate film formation strategies where
Figure 2B:
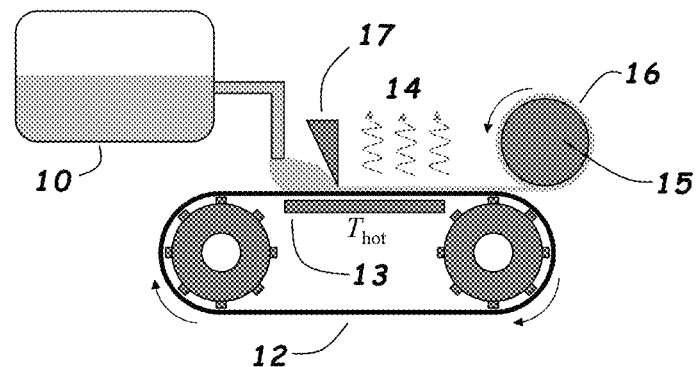
Figure 2C:
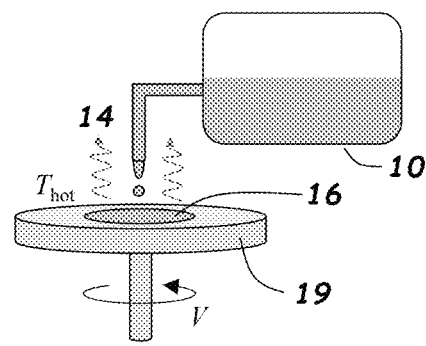
Figure 2D:
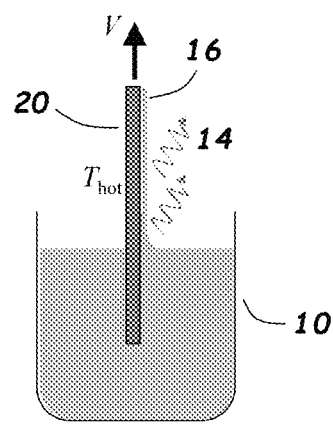
Figure 2E:
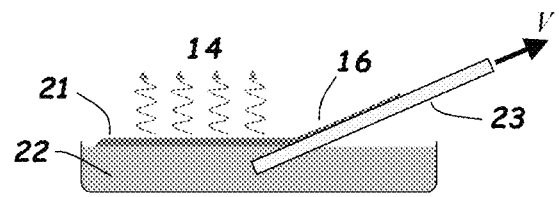
Figure 2F:
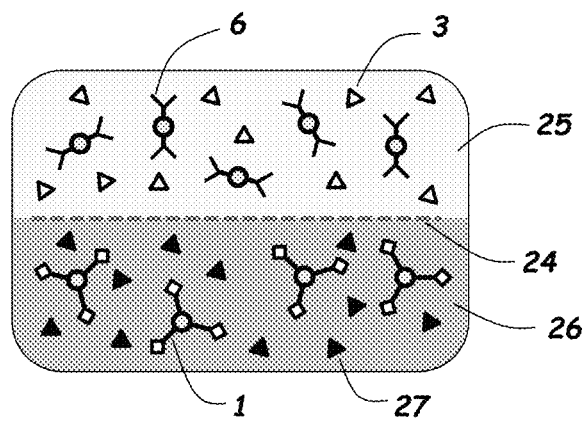

FIGS. 2A-2F illustrate examples of film-forming techniques. In FIG. 2A, monomer solution 10 (also referred to as film dope) is forced through a slot die 11, and then deposited onto a rolling belt 12. The belt is heated directly or via external heaters 13 such as radiant of forced air heaters, causing solvent evaporation 14 and resulting in a 2D polymer film 16 that is collected onto a webbed backing or directly onto a take-up roller 15. In FIG. 2B, film dope 10 is applied to a belt 12 and then reduced to a controlled thickness via a doctor blade 17. Solvent is removed (14) via heating 13 and airflow, resulting in a 2D polymer film 16 that is collected onto a roller 15. In FIG. 2C a spin coating process is applied, in which film dope 10 is deposited onto a rapidly rotating heated substrate 19, where centrifugal forces induce flow and thinning of the dope into a thin and uniform liquid film layer that undergoes solvent evaporation 14 to become a 2D polymer film 16. In FIG. 2D, dip coating is used, in which a heated substrate 20 is immersed in film dope 10, and then slowly removed from the solution. Solvent evaporation 14 leads to formation of a 2D polymer film 16. In FIG. 2E, a thin film of dope 21 is floated on a liquid substrate 22, allowed to polymerize as solvent is removed (14), and then mechanically collected onto a substrate 23 to form a 2D polymer film 16. In FIG. 2F, a 2D polymer film 24 is formed at the liquid-liquid interface between two immiscible solutions 25 and 26. Reactive monomer may be selectively dispersed in each liquid region; for example, solution 25 may comprise monomer 6 in solvent 3, while solution 26 may comprise monomer 1 in solvent 27.

In some implementations/embodiments, some combinations (including all) of the methods described in FIGS. 2A-2F can be executed together to create a thin film, or multiple times to create a thick film. Film deposition techniques can be sequenced, with or without new chemistries, to create multi-layer and heterogeneous films. It may be necessary to chemically or thermally convert each film layer before depositing a new layer.

Figure 3A:
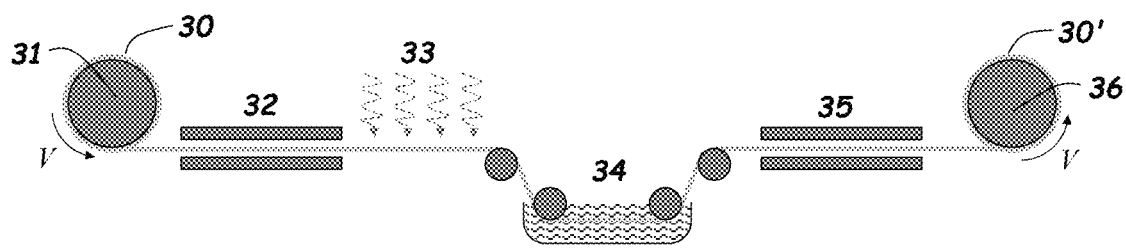
FIGS. 3A and 3B show post-processing of 2D polymer films where
Figure 3B:
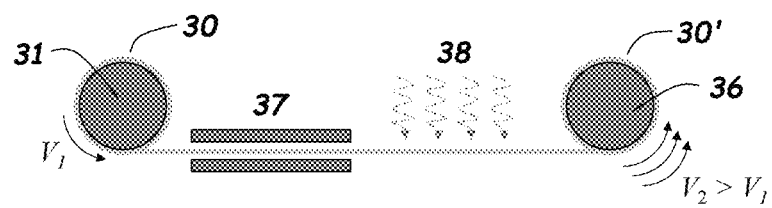

FIGS. 3A and 3B show methods for post-processing a 2D polymer film. In FIG. 3A, 2D polymer film 30 is dispensed from a roller 31, heated and dried (32), exposed to ultraviolet (UV) radiation (33), washed and/or buffered (34), heated and dried again (35), and then collected onto roller 36 as a finished film 30'. These steps can lead to a clean and neutralized film that will be time-stable and amenable to packaging and integration with other materials. In FIG. 3B, the 2D polymer film 30 is heated (37) while subject to stretching, as provided by a take-up velocity faster than the feed velocity. After stretching, the film is cooled (38) prior to collection on take-up roller 36. This heated drawing process can improve the orientation and crystallinity of films, which can increase mechanical and thermal robustness.

Figure 4A:
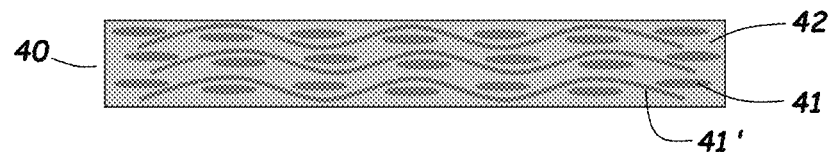
FIGS. 4A-4E illustrate 2D polymer composites where
Figure 4B:
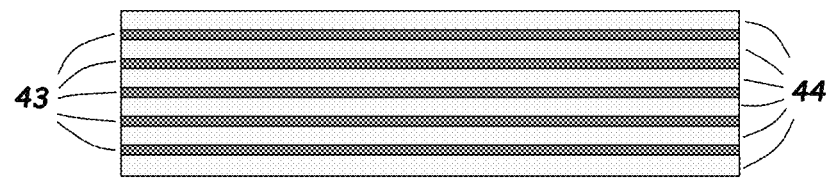
Figure 4C:
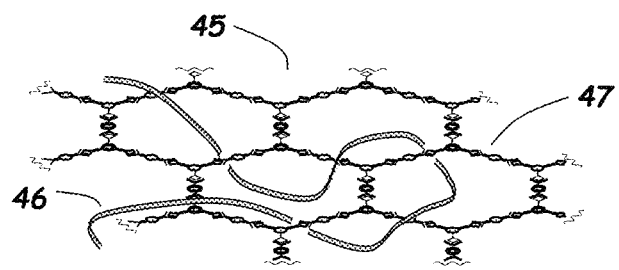
Figure 4D:
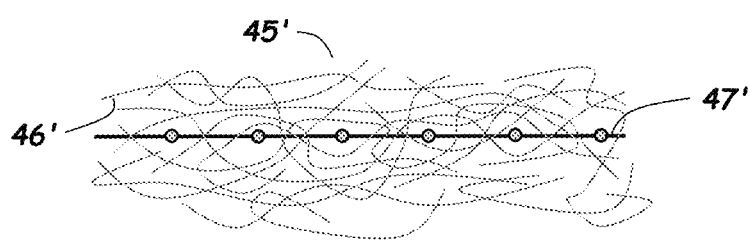
Figure 4E:
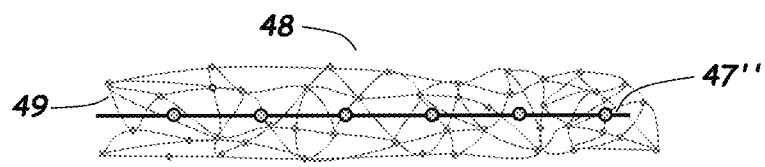

FIGS. 4A-4E illustrate some exemplary 2D polymer composites according to various embodiments. FIG. 4A shows a composite 40 formed of a fiber reinforcement 41 and 41' within a 2D polymer matrix 42. The fiber matrix can be a woven, knit, braided, or unidirectional structure; fibers can include but are not limited to glass, carbon, boron, aramid, and nylon. The 2D polymer can be vacuum infused, pressure infused, dipped, or manually coated onto the reinforcement. FIG. 4B shows a heterogeneous material stack where a plurality 2D polymer film layers 43 are interspersed with a plurality of thin layers of a second material 44. The second material could be another 2D polymer, a linear polymer, a thermosetting polymer, a metal, a ceramic, a glass, or a 2D material such as graphene or boron nitride. Multiple material layers, stacking patterns, or a gradient in material selections can be implemented in this heterogeneous material stack to achieve functional and/or advantageous properties. FIG. 4C shows a composite 45 comprising a linear polymer 46, such as a thermoplastic, that penetrates through the pores of a 2D polymer molecule 47. Example thermoplastics could include but is not limited to polyamide, polyethylene, polyester, and thermoplastic urethane. In FIG. 4D, a composite 45' comprises many linear polymer molecules 46' penetrating through one or more 2D polymer molecules 47', providing highly efficient load transfer between the bulk linear thermoplastic and the 2D polymer reinforcement. In FIG. 4E, a composite 48 comprises a thermosetting or crosslinking polymer 49 that forms a random 3D network that penetrates through the pores of one or more 2D polymer molecules 47", providing highly efficient load transfer between the bulk thermosetting polymer and the 2D polymer reinforcement.

Figure 5A:
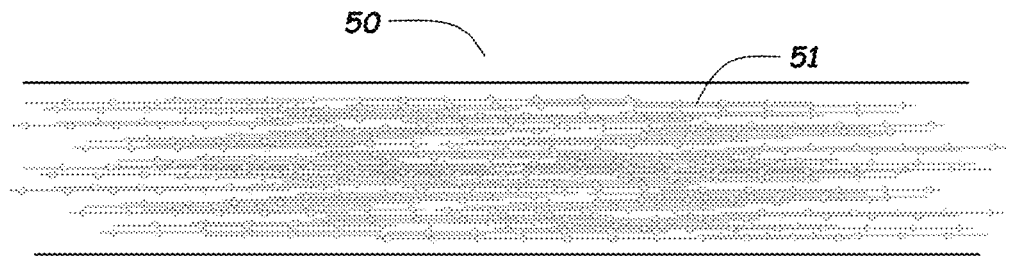
FIGS. 5A-5D depict 2D polymer molecular ensembles where
Figure 5B:
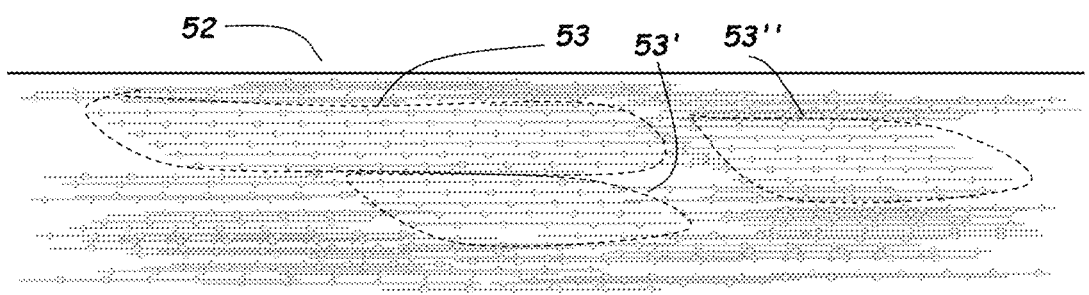
Figure 5C:
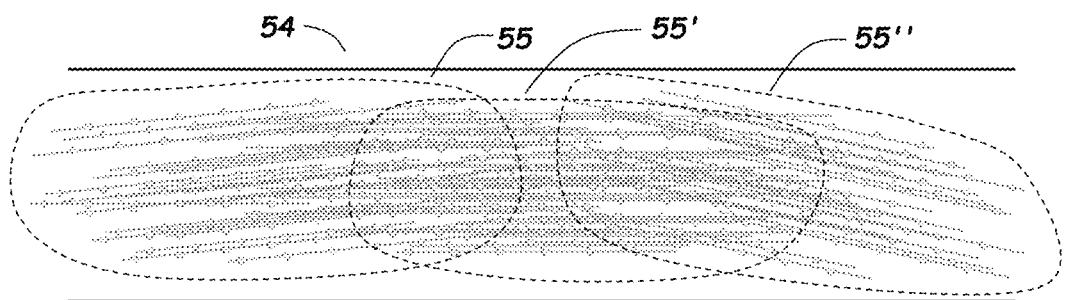
Figure 5D:
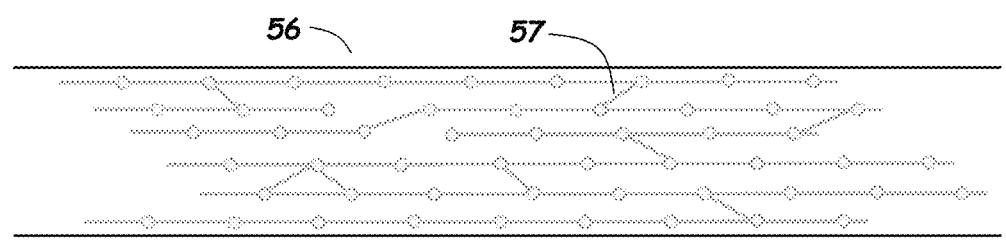

FIGS. 5A-5D shows some exemplary 2D polymer molecular ensemble variations according to embodiments. FIG. 5A shows a highly oriented film 50 with low crystallinity, in which the molecules 51 are substantially parallel to each other and relative to the outer faces of the bulk film. FIG. 5B shows a highly oriented, semi-crystalline film 52, comprised of crystalline domains 53, 53', and 53" within more amorphous 2D polymer regions. FIG. 5C shows a film 54 that is amorphous and has regions of high orientation 55, 55', and 55", but all regions are not parallel to each other or to the outer faces of the bulk film. FIG. 5D shows a highly oriented film 56 that has some intermolecular cross-links 57.

Figure 6A:
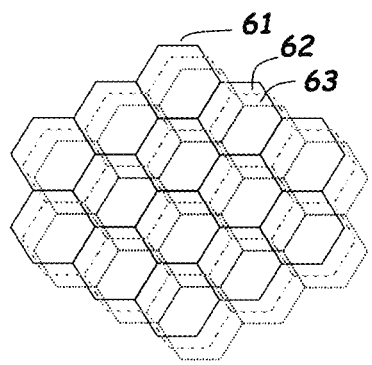
FIGS. 6A-6C depict ensemble stacking variations where
Figure 6B:
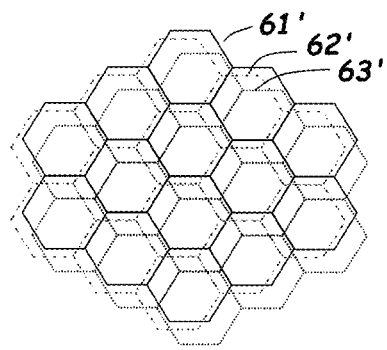
Figure 6C:
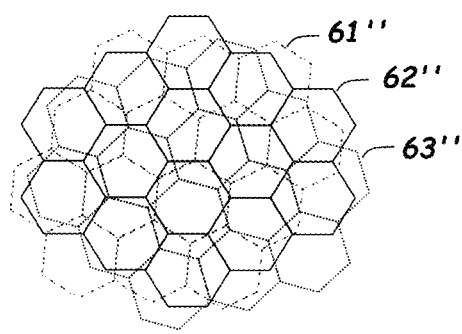

FIGS. 6A-6C are schematics of inter-layer registry embodiments. FIG. 6A shows layers 61, 62, and 63 that are of consistent rotational orientation, and regular translational registry; this configuration is generally considered to be a regular crystalline stacking. In FIG. 6B, the layers 61', 62', and 63' have consistent rotational orientation, but each layer has a somewhat arbitrary translational registry. FIG. 6C shows a turbostratic stacking of layers 61", 62", and 63" in which both rotational and translational registries are irregular.

Figure 7A:
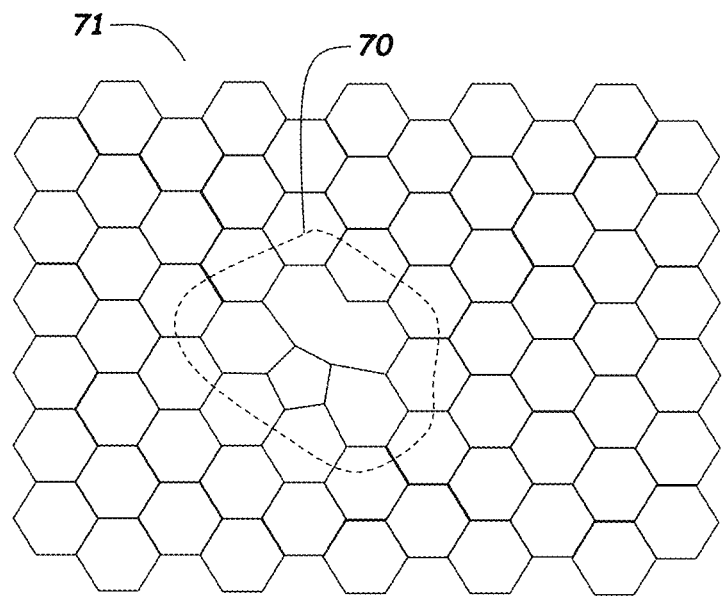
FIGS. 7A and 7B show crystalline flaws within a molecule where
Figure 7B:
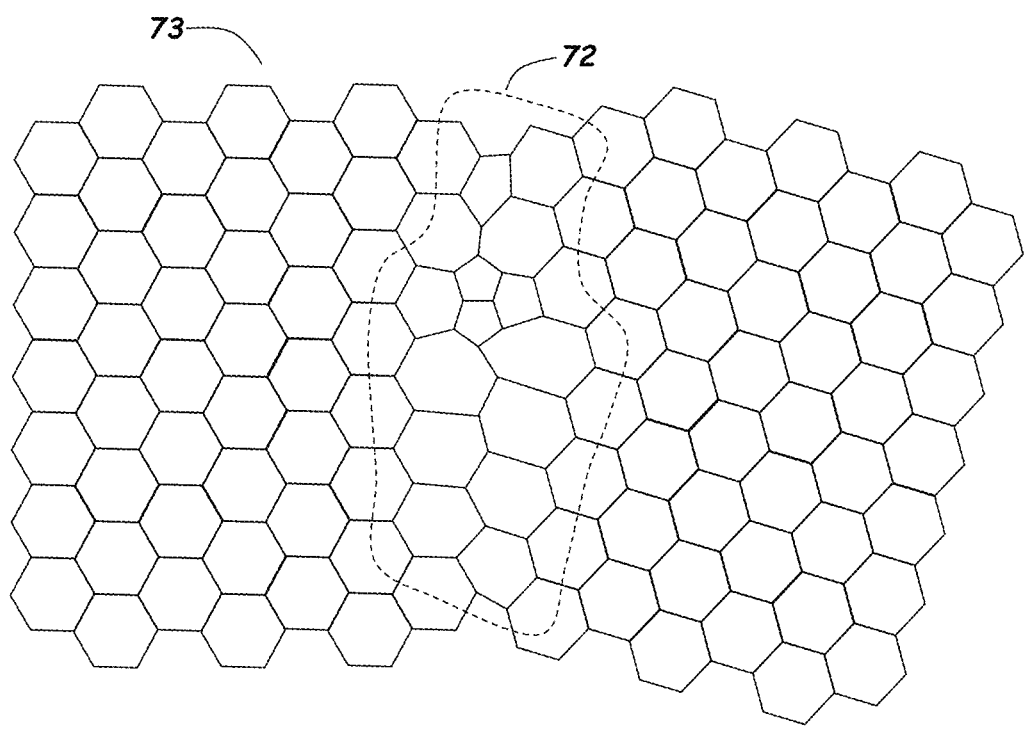

FIGS. 7A and 7B are schematics depicting flaws within a molecule. FIG. 7A shows a flaw region 70 embedded within a single crystalline plane of 2D polymer molecule 71. FIG. 7B shows a grain boundary 72 where two crystalline planes intersect within a 2D polymer molecule 73.

Figure 8A:
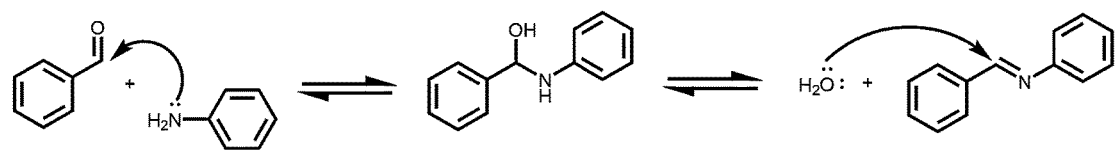
FIGS. 8A and 8B depict 2D polymerization reactions where
Figure 8B:
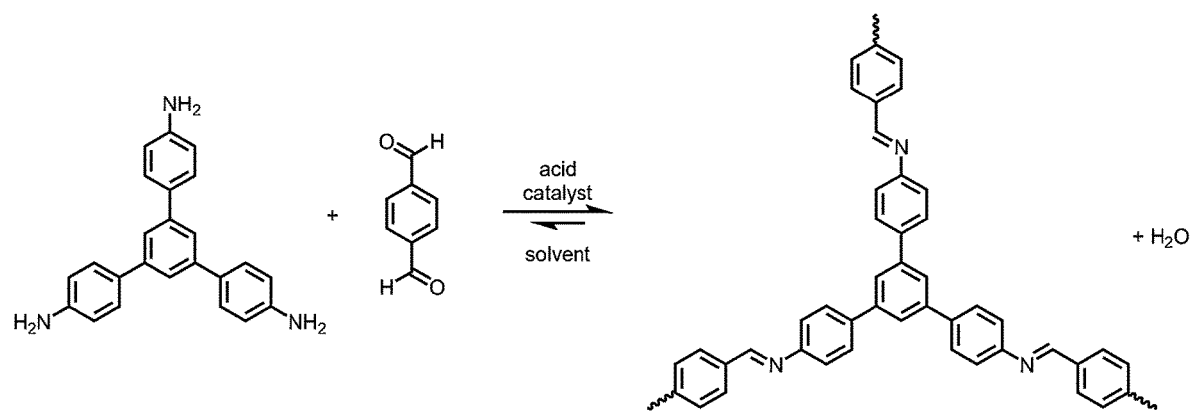

FIGS. 8A and 8B depict some exemplary 2D polymerization reactions according to embodiments. FIG. 8A shows a shows a reversible linker reaction, in which an aromatic amine and aromatic aldehyde undergo reversible conversion to imine. FIG. 8B shows the acid catalyzed reaction of 1,3,5-tris(4-aminophenyl)benzene (TAPB) with terephthaldehyde (PDA) to form an imine-linked 2D polymer.

Figure 9:
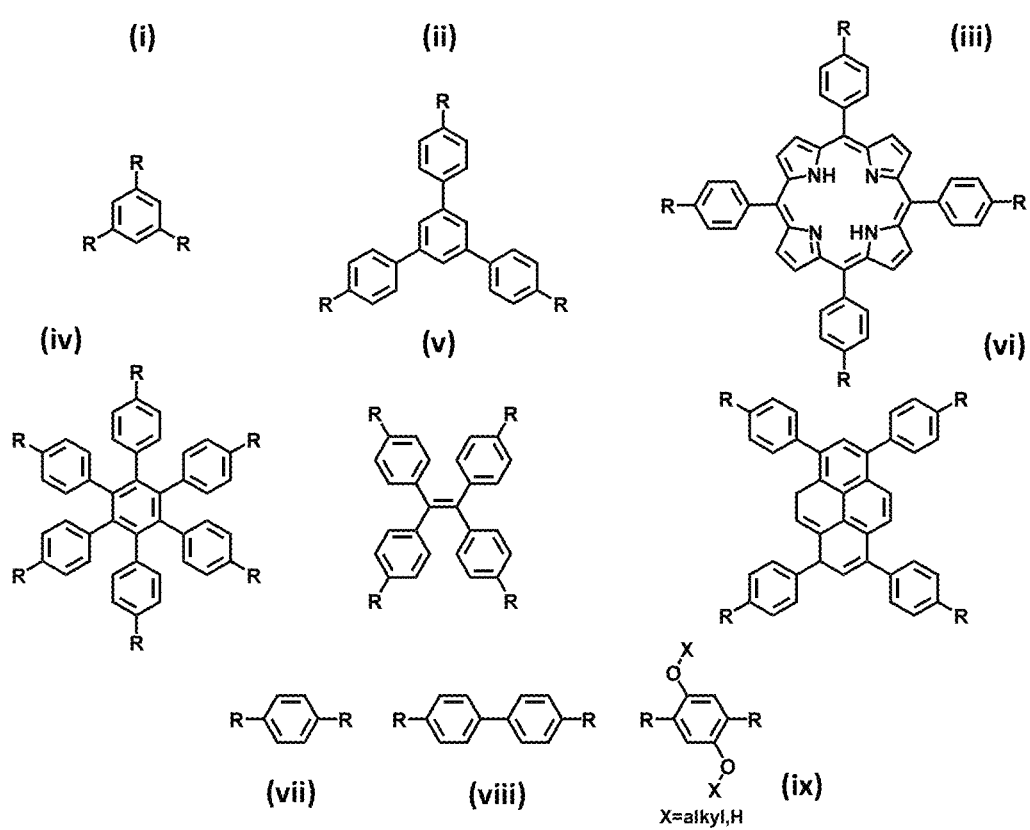
FIG. 9 illustrates other aromatic amine and aldehyde monomers that could react to form imine-linked 2D polymer films.

FIG. 9 provides examples of reactions between other aromatic amine and aromatic aldehyde-type monomers that react to imine-linked 2D polymer films. In this schematic the R groups are defined as amines or aldehydes, resulting in imine products. However, the R groups could also be other reactive functional groups. Both irreversible and reversible chemistries could be applicable, although reversible chemistries are particularly attractive. Reversible chemistries include, but are not limited to, phenazine, imide, azine, cyanovinylene, boronic ester, hydrazone, benzoxazole, or β-ketoenamine.

EXAMPLES

Multiple specimens of the TAPB-PDA polymer were produced for comparison. Conventional TAPB-PDA powder was synthesized by first dissolving the monomers in a 4:1 mixture of dioxane/mesitylene solvent, and then adding an acid catalyst, such as acetic acid or scandium triflate. After a period of time the precipitated polymer was washed with an organic solvent, such as methanol, to remove the acid catalyst, and then washed with liquid $CO_2$, which is then removed under supercritical conditions. This material will be referred to herein as the 2D polymer powder.

TAPB-PDA film was produced by first dissolving the parent 2D polymer powder in a mixture of trifluoroacetic acid (TFA) and water (95/5 v/v) to achieve a final solution of 5 wt % solids relative to the volume of solvent. This solution was then drop-cast into an aluminum pan. After about 30 minutes at room temperature in a fume hood, the solvents had largely evaporated from the cast solution, leaving behind a black/green film with tens of μm thickness. This film was then immersed in ethanol for 10 minutes, transferred to a solution of 5% triethylamine in ethanol, and after another 10 minutes then washed again with ethanol. The obtained yellow film was washed with liquid $CO_2$ followed by supercritical removal, resulting in a final film that will be referred to as "film from 2DP." Triethylamine is used as a base wash to neutralize protonated imine and remove TFA. KOH and NaOH have also been used successfully as a base wash.

A second film was produced by directly dissolving the TAPB and PDA monomers in the TFA/water (95/5 v/v) mixture at a concentration of 5 wt % solids relative to the volume of solvent. This solution was cast into a metal foil pan, and then dried, neutralized, and rinsed identically to the process as described for the film from 2DP. We will refer to this film as "film from monomer." The appearance of the film from monomer at each stage of this process was visibly indistinguishable relative to the film from 2DP.

$N_2$-sorption isotherms and Brunauer-Emmett-Teller (BET)-derived surface area values for synthesized 2D polymer powder and drop cast films were characterized. Higher BET values are indicative of greater $N_2$-accessible surface area, which results from regular stacking of 2D polymer sheets in the z-direction to form open meso-size pores. The 2D polymer powder showed the highest surface area (2382 $m^2/g$), followed by drop cast film from powder (1558 $m^2/g$), and followed by drop cast film from monomer (1090 $m^2/g$). All specimens show measureable surface area, indicating materials of good, but not excellent, quality. BET pore size distributions showed groupings near the theoretical pore diameter of 3.2 nm, as calculated from density functional theory for TAPB-PDA, another confirmation that the synthesized material was the 2D polymer depicted in FIG. 9.

Infrared (IR) data indicated very similar reaction products for 2D polymer powder, film from powder, and film from monomer. X-ray diffraction (XRD) patterns for all three samples are also similar, and match closely with peak positions predicted using density function theory for TAPB-PDA. These results show that the process of producing films, whether from monomers or 2D polymer powder, leads to films that are substantially composed of 2D polymer.

A third film was produced via doctor blading. The starting film dope was a mixture of monomer in solvent, similar to the second film described above; but, in this case, with three equivalents of aniline relative to the amine monomer added to the casting solution. Approximately 0.2 mL of solution was deposited onto a cleaned glass substrate, which was then immediately wiped with a doctor blade set to a gap height of 25 μm. Within a few minutes, as the solvent mixture evaporated, the reddish liquid film transformed into a deep green or black solid film. The film was then rinsed and neutralized in a manner identical to drop-cast films. The film delaminated from the glass substrate with gentle agitation of the glass.

Properties of these films made via doctor blading were compared with 2D polymer powder. The 2D polymer powder was produced as described in the first example, but with the addition of 10% aniline, which slightly increased the quality as characterized by BET surface area. Also characterized were a fourth, fifth, and sixth film, all produced by doctor blading. The fourth film used a film dope produced from 2D polymer powder added to solvent; the fifth film was produced by adding monomer to solvent; and the sixth film was similar to the fifth film, but with the addition of aniline. The details of solvent composition and solids content are comparable to those described in the earlier, drop cast film examples. The general appearance and progression of film production for all these films was comparable to the earlier films drop cast from polymer and monomer.

$N_2$-sorption isotherms, BET-derived surface area values, and pore size distributions were measured for synthesized 2D polymer powder and doctor-bladed films. The parent 2D polymer powder had the highest BET value (2327 $m^2/g$). The film cast from dissolved powder had a lower BET value (1200 $m^2/g$). The two films cast from dissolved monomer had slightly lower BET values (950-967 $m^2/g$) than the film cast from powder. These results show that films generally have lower BET values than powder, which may be related to molecular quality, or crystallinity, or simply the higher bulk surface area of a powder versus a film. The results also show that the films still have relatively high surface areas compared to monomer solids or conventional linear polymers, which lack a network of nm-scale pores and would generally have BET values of less than 10 $m^2/g$. Finally, these results show that films cast from monomer are nearly identical in quality to films cast from powder. However, many fewer steps are necessary to cast from monomer, making film production much simpler, requiring significantly less cost and time to produce.

IR data was measured for the doctor-bladed TAPB-PDA materials. All of the film IR spectra were similar to the spectra measured for the powder with a strong adsorbance at about 1620 $cm^{-1}$, indicating the formation of imine bonds. Films produced from dissolved powder or monomer showed an adsorption at about 1700 $cm^{-1}$ as well, which may be caused by some unreacted aldehyde groups in the polymer. This adsorption was significantly suppressed in the film when aniline was added to the mixture, which may be due to the aniline capping off any unreacted aldehyde groups. XRD patterns were measured for the various specimens, showing similar structure between TAP-PDA powder, films formed by doctor-blading TAPB-PDA 2D polymer in TFA solution, films formed by doctor-blading TAPB and PDA monomers in TFA solution, and films formed by doctor-blading TAPB and PDA monomers with aniline modulator in TFA solution.

Based on BET characterization values, the drop cast films have somewhat higher quality (higher surface area) compared to the doctor bladed films. The primary mechanism for the increased quality is, most likely, the slower drying of the thick drop cast films. The drop cast films required a few hours to dry, whereas the doctor bladed films required only a few minutes to dry. Slower drying times allow more time for rearrangement of the reversible imine bonds, leading to a final polymerization state more similar to an ideal, low energy, well-formed 2D polymer. This comparison highlights the importance of controlling film formation conditions. For example, doctor blading followed by slower evaporation (via a closed, vapor-saturated environment; cooler temperatures; or a high vapor temperature solvent) would be expected to increase the quality of the doctor bladed films.

A sixth film was produced by spin casting the solution containing monomer, where the film dope was created similar to the method described for producing the second film. A clean glass microscope was mounted to the spin coater via a vacuum chuck. The spin coater was set to a speed of 2,500 RPM, and was allowed to spin up to full speed prior to deposition. Approximately 0.05 ml of solution was dropped onto the spin coater, which spread the solution into a thin film within a fraction of a second. The spin coater was then turned off after 1 minute, and allowed to come to rest. The as-cast film was red in appearance. This film was rinsed with ethanol, resulting in a thin yellow film on the microscope slide. This film will be referred to as a "thin film from monomer."

The spun cast 2D polymer thin film on glass, which was cast from monomer solution of TAPB and PDA in TFA and water, was transferred to a silicon substrate populated with many thousands of microetched circular wells, ranging in size from 1-5 μm. The transfer was undertaken by delaminating the 2D polymer film from the glass substrate it was cast onto in a bath of deionized water, the silicon substrate with etched circular wells was then submerged in the water underneath the floating 2D polymer film and raised to lift the film onto the silicon substrate. Raman spectra for this film cast from monomer solution compared favorably with films cast from polymer solution (TAPB-PDA powder was dissolved in TFA and water and then cast into films), TAPB-PDA neat powder, and TAPB and PDA monomers. A surface profile was measured for one of the films over a 30 μm scan length, including the edge of the film, using an atomic force microscope (AFM) on an Asylum Cypher model AFM with an AC-160 silicon tip. Over the film itself, surface roughness, as measured by Ra value, was only 0.3 nm over that 30 μm length, indicative of a material that is nearly atomically flat. This extreme flatness would be expected for a highly oriented 2D polymer film, due to the planar nature of the 2D polymer molecules. The trace also indicates that the average film thickness was 65 nm.

A force-depth history was measured by driving a nanoindentor downward at the center of an area of film suspended over a 70 μm diameter well using a Hysitron TI-980 nanoindenter with a conical diamond tip with a tip radius of 1 μm. As described in Lee et al., "Measurement of the Elastic Properties and Intrinsic Strength of Monolayer Graphene," Science Vol. 321, Issue 5887, pp. 385-388, 2008, herein incorporated by reference in its entirety, the force versus downward displacement data can be analyzed to provide information on the stiffness and strength of the film. The results of this experiment indicate a stiffness of 24 GPa for the TAPB-PDA film. Additional measurements on similar films have produced stiffness values as high as 30 GPa. These values can be compared to molecular dynamics calculations that predict that the intrinsic stiffness of the TAPB-PDA molecular crystal is 37 GPa. As described in Sandoz-Rosado et al., "High strength films from oriented, hydrogen-bonded "graphamid" 2D polymer molecular ensembles," Scientific Reports, Vol. 8, Issue 1, pp. 1-11, 2018, herein incorporated by reference in its entirety, the stiffness of an ensemble film is dependent on the size and orientation of the molecules, as well as propensity for intermolecular bonding. The similar magnitude of the measured film stiffness, and the theoretical molecular stiffness, indicates that these spun cast molecular ensembles either have very high molecular weight, or are very well aligned relative to the film surface, or both. These results suggest that the spin casting methods result in films of very high quality.

A failure strength of 1.55 GPa was also measured for the TAPB-PDA film using the technique outlined in the aforementioned Lee et al. 2008 Science paper, using nanoindentation with a conical diamond probe with a hemispherical tip with a radius of 1 μm.

The skeletal density of TAPB-PDA powder was measured using helium pycnometry, resulting in a skeletal density value of 1.25 $g/cm^3$. This skeletal density value represents the density of the node and linker network as a framework, rather than the bulk density of the material, since the helium gasses can penetrate into the pores of the 2D polymer molecule during pycnometry measurements. Following published methods (see, e.g., Jiang et al., "High Methane Storage Working Capacity in Metal-Organic Frameworks with Acrylate Links," J. Am. Chem. Soc. 2016, 138, 10244-10251, herein incorporated by reference in its entirety), the skeletal density can be combined with BET surface area density measurements to estimate the effective bulk density of the polymer solid. The results show that the bulk polymer density decreases with increasing BET area, presumably as the 2D polymer molecules more closely resemble the ideal porous molecular structure and/or achieve more intermolecular pore alignment. Some of the lowest density materials achieved a density value very similar to the ideal density and BET surface area for the perfect TAPB-PDA molecular crystal, as calculated via density functional theory. This agreement suggests that some synthesized materials are very similar to the ideal molecule structure. The consistency of these density values and trends provide validation that 2D polymer powders can be synthesized with densities as low as 0.4 g/cm$^3$.

Complementary density measurements were performed on a spin coated thin film of TAPB-PDA. This particular film sample had a thickness of 95 nm, as measured via AFM. Because this film is so thin, it was very low mass and it is not possible to directly measure bulk density via, for example, volume displacement or pycnometry. Instead, density can be estimated by studying the natural frequency of an edge-supported circular membrane. The natural frequency of the membrane was measured in an AFM by using a blue thermal laser to drive oscillation over a range of frequencies, while a red sensing laser measured the amplitude of vibration. An obvious discontinuity in amplitude was observed at a frequency of 1.32 MHz, indicative of a resonant response. The same membrane was then center-loaded with the AFM tip to generate a load versus displacement curve, which can by analyzed to estimate the film prestress. Using a membrane resonant formula, these measurement parameters can be combined to calculate the apparent film density. These calculations resulted in a measured film density of 0.36 g/cm$^3$. A similar resonant experiment was conducted on another thin film sample using a slightly different AFM characterization technique, in which the AFM tip was placed in contact with the center of the suspended film, and then the cantilever frequency was swept until a severe phase shift in the response signal relative to the drive signal was observed. Using this frequency value, along with film tension and thickness values, resulted in an estimated film density of 0.54 g/cm$^3$.

These density values are much lower than typical linear or crosslinked polymer densities, which typically range between 0.95-1.5 g/cm$^3$. For example, a high performance para-aramid linear polymer like poly-p-phenylene terephthalamide has a mass density of 1.44 g/cm$^3$. For many applications, such as air vehicles or body armor, materials are needed are stiff and strong, but also lightweight. The unique combination of low density and high stiffness as measured in these 2D polymer films suggest their relevance to these weight critical applications.

In linear crystallizable polymers such as polyethylene or nylon, optical transparency can be associated with crystalline state. If the materials are cast in a manner than leads to an amorphous state, such as rapid quenching from melt, the bulk film is likely to be transparent. If instead the film is cooled more slowly, an opaque film results. The opacity is associate with the film having a semi-crystalline state, with crystalline and amorphous domains intermixed. Since amorphous and crystalline regions will have differing indices of refraction, light is scattered and diffracted through the thickness and the film will appear opaque. In principle, a perfectly crystalline linear polymer film is possible and would also result in optical transparency. However, creating a perfect crystalline film is very difficult and therefore is not commonly encountered. Based on these observations, it is possible that the transparent 2D polymer films have a non-crystalline character, and the opaque 2D polymers films have a semi-crystalline character. This hypothesis would be consistent with the observation that thicker films and slower drying rates lead to more opaque films, while thinner films and faster drying rates tend to produce transparent films. Even if the transparent films are non-crystalline, for instance, as depicted in FIGS. 6A-6C, they may still be highly oriented and produce films of high mechanical robustness.

Processing has been shown to significantly influence the final film appearance. Three TAPB-PDA 2D polymer films were produced from monomer solution in TFA/water. One drop cast film had an opaque, yellow appearance. The relatively slow solvent evaporation (roughly one hour to create a dry film) may allow for the creation of a semi-crystalline state. Another film was doctor bladed, resulting in a thinner film that dried in a few minutes to form a transparent orange film. The faster drying time may not allow sufficient time for the film to generate significantly large regions of crystallinity to scatter light and produce an opaque film. Two spin-coated films, one without aniline, and one with aniline were also fabricated; the film without aniline was transparent yellow, the film with aniline was an opaque whitish-yellow. The presence of aniline slows polymerization, and may allow for a semicrystalline state that leads to an opaque appearance.

The effect of solvent composition was studied by adding TAPB and PDA monomers to a solvent mixture at a mass fraction of 5 wt %. When added to a mixture of 95% TFA and 5% water, the result was a cherry red, very uniform and clear liquid. The clarity of this liquid suggests that the monomers are dissolved in the solvent. Note that the monomers may be undergoing some polymerization in this solution, perhaps forming oligomer or small 2D polymer molecules. Due to the reversibility of the imine bonds, these oligomers, small molecules, and monomers are likely to be continuously forming and breaking relative to some equilibrium condition. Therefore, when films are cast from this solution, the solution may contain a mixture of monomer, oligomer, and 2D polymer that further polymerizes as the solvent is removed, leading to formation of a solid film. Films produced from this liquid are likely to have high quality. Film quality may also be correlated with amount of time allowed for the casting solution to equilibriate prior to deposition and conversion to film.

The same monomers at 5 wt % were also added to pure TFA, a mixture of acetic acid and water, and a mixture of 95-97% sulfuric acid (3-5% water). The TFA and acetic acid samples show poor dispersion, exhibiting an opaque appearance with poor solids dissolution. These solutions could not be used to form a high quality film. The sulfuric acid solution, in contrast, has high clarity and no obvious solids content. Additional 5 wt % monomers were added to mixtures of acetic acid and water, with increasing water content. Even at 20% water content, dispersion and solids dissolution is poor. These results demonstrate the importance of solvent selection, and the viability of TFA/water and sulfuric acid/water as spinning solutions. We believe that for the case of pure TFA, the monomers are able to fully dissolve in the solution, but then polymerize into products that are unstable in solution, crashing out of the solution as solids. For the cases of acetic acid and acetic acid with water, the monomer does not readily dissolve in the solvent, resulting in monomer solids present in the solution. In contrast, for the cases of TFA with water, and sulfuric acid with water, the monomers are able to dissolve, and any polymer or oligomer that is formed remains dissolved or stably suspended in solution at a very fine scale.

A process was demonstrated for conversion of imine-linked 2D polymer film to amide-linked 2D polymer film. The imine linkage is converted to an amide linkage using sodium chlorite as oxidant, acetic acid as a catalyst, and 2-methyl-2-butene scavenger in a mixture of water and dioxane. The film color changes from yellow to dark brown indicating conversion of the imine linkages to amide linkages.

Imine-linked 2D polymer powders or films can also be converted to amine-linked 2D polymer powders or films using reductants such as sodium borohydride or sodium cyanoborohydride in an organic solvent such as methanol. For example, a powder of TAPB-PDA 2D polymer was submerged in a bath with a large stoichiometric excess of sodium borohydride in methanol, at room temperature for one day. The powder changed color from mustard yellow to straw yellow during the conversion. Fourier transform infrared (FTIR) spectroscopy-Attenuated total reflectance (ATR) measurements confirmed complete conversion of imine groups to amine groups.

Other monomer combinations can also be used for making imine-linked 2D polymers. A doctor bladed film was formed from the combination of triformylbenzene (TFB) and 4,4'-Diaminobiphenyl (DABP), at an 20 wt % addition to a solvent mixture of 95% TFA and 5% water. The solution formed a film in a similar manner to TAPB-TPA, but with slightly different visible coloration. The different colors may be associated with differences in the chemical structures of the molecules.

Another film was produced based on 1,3,5,8-tetra(4-aminophenyl) pyrene (TAPPy) and PDA monomers. First, 2D polymer powder was synthesized, then dissolved at 20 wt % in a solvent mixture of 95% TFA and 5% water. This solution was doctor bladed to produce a film. Similar attempts to create a doctor bladed film starting from monomer were unsuccessful, because the monomer solution retracted quickly after blading, creating a broken pool of fluid that produced a low quality film. A second experiment using monomer at 17 wt % in a solvent mixture of 95% TFA and 5% water, doctor bladed onto a heated stage at 30° C., resulted in an intact film with good visual quality. It is reasonable to expect that a blend of monomer and pre-reacted polymer could result in further improved film quality and consistency relative to the fully monomer solution. The pre-polymerized 2D polymer is likely partially dissolving in the host solvent mixture, but some remaining oligomer and 2D polymer may enhance processing by any number of mechanisms, which may include: increasing the solution viscosity, improving substrate wetting, reducing surface tension, or accelerating polymerization.

TAPPy-PDA films were produced from monomer solution. The solution consisted of 1.5 wt % of monomer in a solvent mixture of 95% TFA and 5% water. Spin conditions were similar to the example described above for spin-coated TAPB-PDA film. The as-cast film had a brown appearance, while the final film after rinsing and buffering had a deep, transparent yellow color. This film was characterized via AFM, and found to have less than 1 nm of roughness of a 30 μm scan distance, with an apparent stiffness of 49.5 GPa and an apparent breaking strength of 2.8 GPa using the aforementioned indentation technique.

Composites were also made with 2D polymer. A lightweight E-glass fabric was saturated with a 20 wt % solution of TAPB-PDA powder in 95% TFA and 5% water, and then doctor bladed to form a consistently wetted fabric. Solvent was allowed to evaporate under ambient conditions, and then the system was rinsed and buffered and rinsed again. The resulting micrographs show that the glass fabric is well-wetted by the 2D polymer, creating a well-formed composite that is likely to exhibit excellent load transfer between the fibers and matrix.

Molecular composites were synthesized by 2D polymerization in the presence of linear polymer. Two molecular composite films were produced. Both were based on adding 5 wt % solids to a solvent mixture of 95% TFA and 5% water. For one composite film, the solids were a 50/50 wt/wt mixture of TAPB-PDA powder and nano-cellulose powder (US Forest Service 2012-FPL-CNF-047); for the second composite film, the solids were a 50/50 wt/wt mixture of TAPB-PDA powder and Covestro Texin 470AU thermoplastic urethane. The cellulose film was doctor bladed and Texin film was drop cast and each formed a uniform and transparent solid film. The urethane-based composite also exhibited opalescence, which can be associated with regular structures at sub-μm length scales. This opalescence could be an indication of molecular planarity, orientation, or crystallinity.

Additional molecular composite films were created using the same recipes as described above, but the TAPB-PDA was introduced as monomer rather than pre-reacted 2D polymer. The resulting films were opaque yet robust indicating that molecular composites can be made directly from monomer-based solutions.

Solvent annealing was demonstrated on a TAPB-PDA film. Two films were first synthesized from monomer solution followed by doctor bladed, similar to the methods described above. One film was subject to the normal rinsing, buffering, and drying protocols, resulting in a surface area density of 1338 $m^2/g$ as measured via BET. The second film was subject to an ethanol rinse followed by annealing the film in ethanol at 70° C. for 72 hrs. This second film was buffered, rinsed with ethanol and dried. Characterization of this film via BET resulted in a surface area of 2092 $m^2/g$. This example shows that solvent annealing can significantly improve the molecular perfection of a 2D polymer film.

Table 1, below, compares the mechanical properties of conventional materials, like para-aramid fiber (Kevlar), and epoxy resin, and the novel 2DP TAPPy-PDA film produced. Comparing para-aramid to the 2D polymer, para-aramid has a higher stiffness and strength. However, the density of the 2D polymer is roughly one third of the density of para-aramid. Therefore the density-normalized stiffness and strength for the 2D polymer are considerably higher than those of the para-aramid. For weight sensitive applications such as ballistic body armors, the high density-normalized performance of 2D polymer is advantageous. Comparing epoxy and 2D polymer properties in Table 1, it is evident that the 2D polymer has a dramatically superior stiffness and strength, particularly when considering the density normalized values. For typical fiber-based composite laminates, mechanical properties that are strongly influenced by matrix properties would be expected to significantly benefit from a 2D polymer matrix. Matrix-dominated properties are particularly important for bending, in-plane shear, and transverse loadings. The mechanical property values provided in the table for the 2D polymer are in-plane properties. Outof-plane properties for the 2D polymer are expected to be considerably lower, for example 10 times lower would be a reasonable assumption. Therefore the orientation of the 2D polymer relative to the fiber orientation, laminate planes, and loading directions would need to be appropriately controlled and optimized. Fiber coatings (referred to as "sizings") would need to be chemically compatible with the 2D polymer to enhance fiber-matrix bonding. It may also be possible to tailor the chemical sizing to induce particular 2D polymer orientations in the composite body.

Table 2, below, compares properties of the novel 2D TAPPy-PDA polymer with conventional dielectrics like silicon dioxide, polyimide, SiCOH, and polyethylene. The dielectric constant of the 2D polymer can be estimated based on the known scaling between mass density and dielectric constant (see, e.g., Lanza and Herrmann, "The Density Dependence of the Dielectric Constant of Polyethylene," J Polym Sci. v 28 n 118 p 622. 1958; Bei et al, "Intrinsic low dielectric constant polyimides: relationship between molecular structure and dielectric properties," J Mater Chem C. v. 5, p. 12807, 2017; and Cheng and Lee, "Porous Low-Dielectric-Constant Material for Semiconductor Microelectronics," Chapter in Nanofluid Flow in Porous Media, IntechOpen, 2018, herein incorporated by reference in their entireties). By plotting dielectric constant versus density for a variety of materials, a linear regression line was calculated and used to estimate the dielectric constant of a 2D polymer to be 1.45, given a mass density of 0.4 g/cc. Also shown in that Table are elastic modulus values. The in-plane stiffness of the 2D polymer is considerably higher than any of the organic dielectric materials, suggesting that it would be a physically resilient polymer during integrated circuit manufacturing. Mass loss of a TAPB-PDA 2D polymer as a function of temperature was characterized via thermogravimetric analysis (TGA). Very little mass loss was observed up to 400° C., indicating that this material would be able to survive many of the elevated temperature processes associated with integrated circuit manufacturing.

Considering the formation of 3D-COFs, a solution was made of tetrakis(4-aminophenyl) methane (TKAPM) monomer and PDA monomer at a stoichiometric ratio of 2:1 PDA:TKAPM, with these monomers added to a solvent mixture of 95% TFA and 5% water at total monomer content of approximately 1-10 wt % relative to the overall solvent-monomer mixture. Spin casting the solutions resulted in homogeneous, light yellow films. Because the TKAPM monomer has functional groups arranged in a tetrahedral arrangement, it is expected that the resulting films consist of 3D-COF material. It is expected that similar solutions comprising at least one tetrahedral monomer will also form 3D-COF films upon casting. A second monomer, in combination with the tetrahedral monomer, could be another tetrahedral monomer, or a linear monomer with two reactive groups, or a monomer with multiple reactive groups arranged in a planar configuration. In all these cases where there is at least one tetrahedral monomer, a 3D-COF would be expected to form upon casting.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

TABLE 1

Comparison of mechanical properties for 2DP compared to para-aramid fiber and epoxy resin.

| Material | Tensile modulus (GPa) | Tensile strength (GPa) | Density (g/cc) | Specific tensile modulus (GPa/(g/cc)) | Specific tensile strength (GPa/(g/cc)) |
|---|---|---|---|---|---|
| Para-aramid fiber | 100 | 3.5 | 1.44 | 69.4 | 2.1 |
| Epoxy | 3.6 | 0.04 | 1.46 | 2.47 | 0.03 |
| TAPPy-PDA 2D polymer | 50 | 2.8 | 0.50 | 100 | 5.5 |

TABLE 2

Comparison of physical properties for conventional dielectrics, as well as 2D polymer.

| Material | Density (g/cc) | Dielectric constant | Elastic modulus (GPa) | Source |
|---|---|---|---|---|
| SiO$_2$ | 2.2 | 4 | 60 | 1 |
| Polyimide | 1.35 | 2.7 | 4 | 2 |
| SiCOH | 1.14 | 2.4 | 4 | 3 |
| Polyethylene | 0.95 | 2.34 | 1 | 4 |
| TAPB-PDA 2D polymer | 0.4 | 1.45 | 30 | |

[1]Cheng and Lee. "Porous Low-Dielectric-Constant Material for Semiconductor Microelectronics." Nanofluid Flow in Porous Media. IntechOpen, 2018.
[2]Bei et al. J Mater Chem C. v5 p12807. 2017.
[3]Lee et al. J Mater Res. v23 n3 p856. 2008.
[4]Lanza and Herrmann. J Polym Sci. v28 n118 p622. 1958.

We claim:

1. A method of producing a two-dimensional (2D) polymer film comprising:
    (a) providing one or more first monomers comprising three or more reactive groups per molecule;
    (b) providing one or more second monomers comprising two or more reactive groups per molecule;
    (c) dissolving or dispersing the first and second monomers in a solvent;
    (d) reacting the first and second monomers to form 2D bond network;
    (e) removing the solvent,
    wherein the first and second monomers are selected so as to form 2D polymer comprising:
    a regular, repeating, 2D bond network of (i) a plurality of nodes comprised one or more nodal units which are joined by (ii) one or more linear polymer bridge units, wherein:
      (vii) the bridge units are between 0.1-100 nm long;
      (viii) each node is bonded to 3 or more bridge units;
      (ix) the bridge units maintain the overall planarity of the 2D polymer, wherein the majority of bonds of the bridge units and their adjacent nodal units are located within a limiting distance measured perpendicularly from a single plane upon which the molecule substantially lies corresponding to three times the length of a carbon-carbon single bond; and
(x) the polymer comprises a single molecule having a length greater than 50 nm in both lateral in-plane dimensions.

2. A method of producing a two-dimensional (2D) polymer film comprising:
(a) providing one or more first monomers comprising three or more reactive groups per molecule;
(b) providing one or more second monomers comprising two or more reactive groups per molecule;
(c) dissolving or dispersing the first and second monomers in a solvent;
(d) reacting the first and second monomers to form 2D bond network;
(e) removing the solvent,
wherein the first and second monomers are selected so as to form 2D polymer comprising:
a regular, repeating, 2D bond network of (i) a plurality of nodes comprised one or more carbon-containing cyclic nodal units which are joined by (ii) one or more linear polymer bridge units, wherein:
(iii) the bridge units are between 0.1-100 nm long;
(iv) each node is bonded to 3 or more bridge units;
(v) the bridge units maintain the overall planarity of the 2D polymer, wherein the majority of bonds of the bridge units and their adjacent nodal units are located within a limiting distance measured perpendicularly from a single plane upon which the molecule substantially lies corresponding to three times the length of a carbon-carbon single bond; and
(vi) the polymer comprises a single molecule having a length greater than 50 nm in both lateral in-plane dimensions.

3. The method of claim 2, wherein the bridge units of the 2D polymer comprise, wholly or in part, a ladder polymer.

4. The method of claim 2, further comprising: adding one or more processing additives to the dissolved/dispersed solvent/monomer mixture.

5. The method of claim 4, wherein the processing additives comprise a 2D polymer or 2D oligomer.

6. The method of claim 4, wherein the processing additives comprise a linear, branched, star, comb, and/or hyperbranched polymer.

7. The method of claim 4, wherein the processing additives comprise catalyst, reaction modulators, surfactants, and/or dispersants.

8. The method of claim 4, wherein the processing additive comprises a cross-linkable polymer.

9. The method of claim 4, wherein the processing additives comprise nanoparticles, nano-platelets, and/or nanofibers.

10. The method of claim 2, comprising: confining the dissolved/dispersed solvent/monomer mixture in a gap between two surfaces during and/or after polymerization.

11. The method of claim 2, wherein the dissolved/dispersed solvent/monomer mixture undergoes flow before, during, or after polymerization.

12. The method of claim 2, comprising: subjecting the resulting 2D polymer film to one or more of the following post-treatments: rinsing, neutralizing, thermal annealing, solvent annealing, UV exposure, radiation exposure, e-beam exposure, uniaxial stretching, biaxial stretching, and through-thickness compression.

13. The method of claim 2, wherein the one or more solvents comprise water, trifluoroacetic acid, sulfuric acid, anhydrous sulfuric acid, nitric acid, phosphoric acid, dimethylformamide, dimethylacetamide, n-methyl-2-pyrrolidone, 1,3-dimethyl-2-imidazolidinone, dimethylpropyleneurea, hexamethylphosphoramide, hexafluoro-2-propanol, trifluoroethanol, nitromethane, and/or dimethyl sulfoxide.

14. The method of claim 2, further comprising: chemically treating the resulting 2D polymer film to chemically convert a first bond into a second bond.

15. The method of claim 14, wherein the chemical conversion of a first bond and to a second bond comprises: oxidation of imines to amides; reduction of imines to amines; cyclization of an imine to a thiazole, oxazole, quinolone, pyridine, carbamate or thiocarbamate; linker exchange with an orthohydroxy aldehyde to form a ketoenamine; linker exchange of an imine with hydrazide to form an acyl hydrazone; exchange with hydrazine hydrate to form an azine; and/or exchange with phenyl hydrazine to form a phenylhydrazone.

16. The method of claim 14, wherein the chemical conversion results in subtraction, addition, or re-arrangement of atoms or bonding electrons in the 2D bond network.

17. The method of claim 2, further comprising: casting the 2D polymer film in the presence of fibers, yarns, textiles, fabric, knits, braids, and/or felts to form a fiber-reinforced composite.

18. The method of claim 2, wherein the first and/or second monomers are selected from the group consisting of:

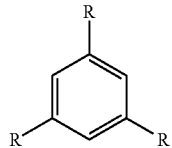

(i)

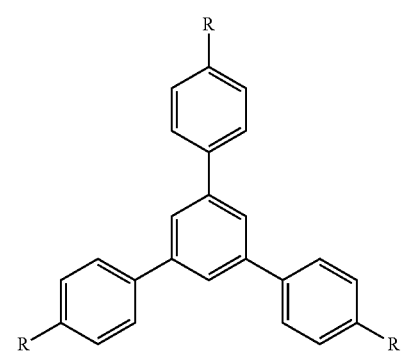

(ii)

-continued (iii)

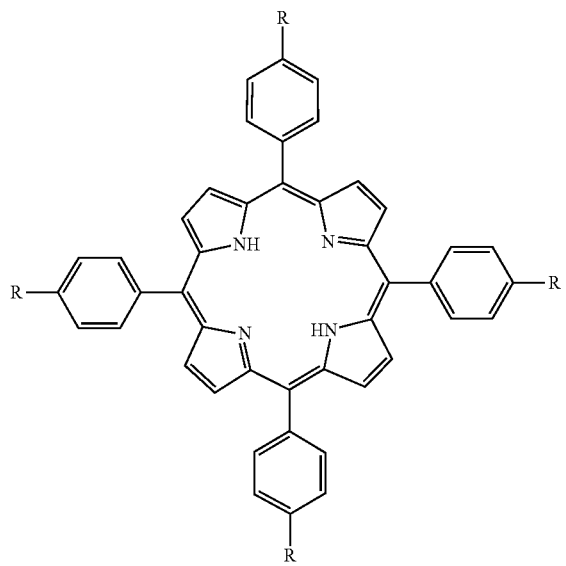

(iv)

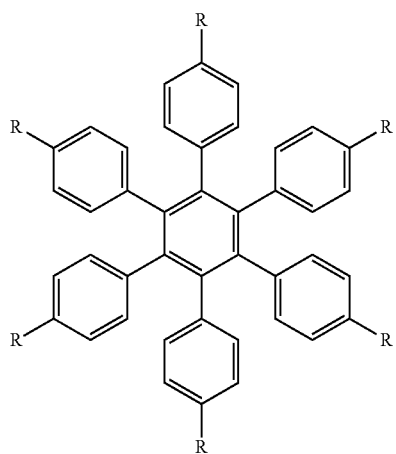

(v)

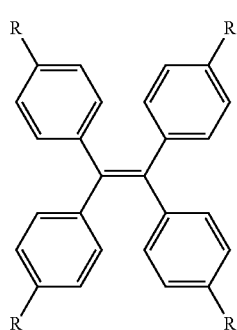

-continued

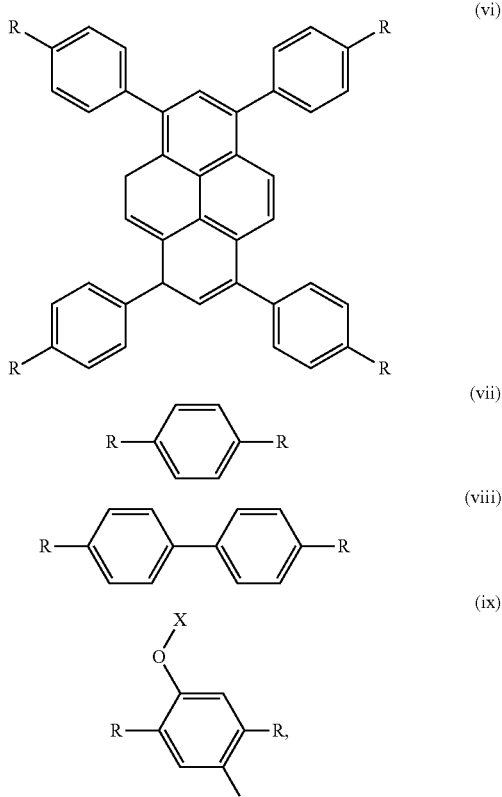

X = alkyl, H where R comprises one or more chemical functional species capable of reacting to form one or more bonds as part of a chemical linkage.

19. The method of claim 18, wherein the resulting chemical linkage is selected from the group consisting of: imine, phenazine, imide, azine, cyanovinylene, boronic ester, hydrazone, ester, benzoxazole, polyhydroquinone-diimidazopyridine and β-ketoenamine.

20. The method of claim 18, wherein the resulting chemical linkage is formed by a Diels-Alder reaction in which a conjugated diene reacts with a substituted alkene to form a substituted cyclohexene derivative.

21. The method of claim 18, wherein the first monomer comprises a first R and the second monomer comprises a second R which are selected so as to react to form a chemical linkage B, and wherein the first R, second R, and chemical linkage B are selected from the group consisting of: an aldehyde and an amine to form an imine; 1,2 diamine and tetraone to form a phenazine; amine and cyclic anhydride to form an imide; aldehyde and hydrazine to form an azine; aldehyde and phenylacetonitrile to form a cyanovinylene; phenolic and carboxylic acid or ester to form a ester; boronic acid and catechol to form a boronic ester; aldehyde and hydrazide to form a hydrazone; aldehyde and 2-aminophenol to form a benzoxazole; a tetraaminopyridine and dihydroxyterephthalic acid to form a polyhydroquinone-diimidazopyridine and/or diamine and phloroglucinol to form a b-ketoenamine.

22. A two-dimensional (2D) polymer film formed by the method of claim 2.

23. The film of claim 22, wherein the film has one or more of the following properties:
 (a) a modulus of at least 10 GPa and a strength of at least 1 GPa;
 (b) a dielectric constant less than 2.5;
 (c) a glass transition temperature of at least 300° C.;
 (d) a mass density less than 1 g/cc;
 (e) a density-normalized modulus of at least 10 GPa/(g/cc); and/or
 (f) a density-normalized strength of at least 2 GPa/(g/cc).

24. The method of claim 23, wherein the nodal unit comprises borozene, silicene, and/or double-bonded carbon.

* * * * *